US012230200B2

(12) United States Patent
Akiyama et al.

(10) Patent No.: US 12,230,200 B2
(45) Date of Patent: Feb. 18, 2025

(54) APPARATUS, DISPLAY APPARATUS, CONVERSION APPARATUS, DEVICE, ILLUMINATION APPARATUS, AND MOVING BODY

(71) Applicant: CANON KABUSHIKI KAISHA, Tokyo (JP)

(72) Inventors: Takahiro Akiyama, Kanagawa (JP); Hiromasa Tsuboi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/532,888

(22) Filed: Nov. 22, 2021

(65) Prior Publication Data

US 2022/0172679 A1 Jun. 2, 2022

(30) Foreign Application Priority Data

Nov. 27, 2020 (JP) ................................ 2020-196853

(51) Int. Cl.
*G09G 3/3233* (2016.01)

(52) U.S. Cl.
CPC ... *G09G 3/3233* (2013.01); *G09G 2300/0426* (2013.01); *G09G 2380/10* (2013.01)

(58) Field of Classification Search
CPC ......... G09G 3/3233; G09G 2300/0426; G09G 2380/10; Y02B 20/30
See application file for complete search history.

(56) References Cited

U.S. PATENT DOCUMENTS

| | | | | |
|---|---|---|---|---|
| 10,930,219 B2 * | 2/2021 | Chen | .................... | G09G 3/3225 |
| 2007/0252206 A1 * | 11/2007 | Yamazaki | ............ | G02B 27/017 257/E21.409 |
| 2008/0029768 A1 * | 2/2008 | Asano | .................. | H10K 59/131 257/72 |
| 2008/0278464 A1 | 11/2008 | Yamamoto | | |
| 2015/0200305 A1 | 7/2015 | Kobayashi | | |
| 2017/0084755 A1 * | 3/2017 | Lee | ................. | H01L 21/823418 |
| 2017/0373094 A1 * | 12/2017 | Park | ...................... | H01L 27/127 |
| 2018/0035053 A1 * | 2/2018 | Mak | ...................... | H04N 23/667 |
| 2019/0317323 A1 * | 10/2019 | Yamaoka | ............... | B60K 35/00 |
| 2019/0379781 A1 * | 12/2019 | Ma | ....................... | G09G 3/3406 |
| 2020/0135826 A1 | 4/2020 | Tsuboi | | |

FOREIGN PATENT DOCUMENTS

JP 2008281671 A 11/2008

* cited by examiner

*Primary Examiner* — Stacy Khoo
(74) *Attorney, Agent, or Firm* — CANON U.S.A., INC. IP DIVISION

(57) ABSTRACT

An apparatus includes a plurality of pixels arranged in an array on a substrate, the plurality of pixels each including a light emitting element, a first transistor, and a second transistor, a drain region of the first transistor being connected to an anode of the light emitting element, a drain region or a source region of the second transistor being connected to a gate electrode of the first transistor. In a plan view perpendicular to the substrate, a length of a current path from the first region to a gate electrode of the second transistor is greater than a length of a current path from a third region to the gate electrode of the second transistor.

25 Claims, 18 Drawing Sheets

APPARATUS, DISPLAY APPARATUS, CONVERSION APPARATUS, DEVICE, ILLUMINATION APPARATUS, AND MOVING BODY

BACKGROUND OF THE DISCLOSURE

Field of the Disclosure

The aspect of the embodiments relates to an apparatus, a display apparatus, a conversion apparatus, a device, an illumination apparatus, and a moving body.

Description of the Related Art

A light emitting apparatus in which pixels each including a light emitting element, such as an organic light emitting element that emits light with luminance based on a current flowing through the element, are arranged in an array has been known. Japanese Patent Application Laid-Open NO. 2008-281671 discusses a pixel including a driving transistor configured to supply a current based on a luminance signal to a light emitting element, and a switching transistor (write transistor) configured to write the luminance signal to a gate node of the driving transistor.

Japanese Patent Application Laid-Open No. 2008-281671 discusses making a lightly doped drain (LDD) length of the switching transistor greater than that of the driving transistor and making a leakage current of the switching transistor lower than that of the driving transistor to reduce fluctuations in the luminance signal due to the leakage current of the switching transistor.

Japanese Patent Application Laid-Open No. 2008-281671 does not take into consideration the case where low resistance regions such as a silicide region are disposed in diffusion regions of the switching transistor. If low resistance regions are disposed in the diffusion regions of the switching transistor, a leakage current occurs more easily in the low resistance regions of the switching transistor. This can destabilize emission luminance of the light emitting apparatus.

SUMMARY OF THE DISCLOSURE

According to an aspect of the embodiments, an apparatus includes a plurality of pixels arranged in an array on a substrate, the plurality of pixels each including a light emitting element, a first transistor, and a second transistor, a drain region of the first transistor being connected to an anode of the light emitting element, a drain region or a source region of the second transistor being connected to a gate electrode of the first transistor. The drain region or the source region of the second transistor that is connected to the gate electrode of the first transistor includes a first region and a second region located between the first region and a channel region of the second transistor. The drain region or the source region of the second transistor that is not connected to the gate electrode of the first transistor includes a third region and a fourth region located between the third region and the channel region of the second transistor. The first and third regions are made of a semiconductor-metal compound. The second and fourth regions are made of a semiconductor. In a plan view perpendicular to the substrate, a length of a current path from the first region to a gate electrode of the second transistor is greater than a length of a current path from the third region to the gate electrode of the second transistor.

Further features of the disclosure will become apparent from the following description of exemplary embodiments with reference to the attached drawings.

DESCRIPTION OF THE EMBODIMENTS

Figure 1:
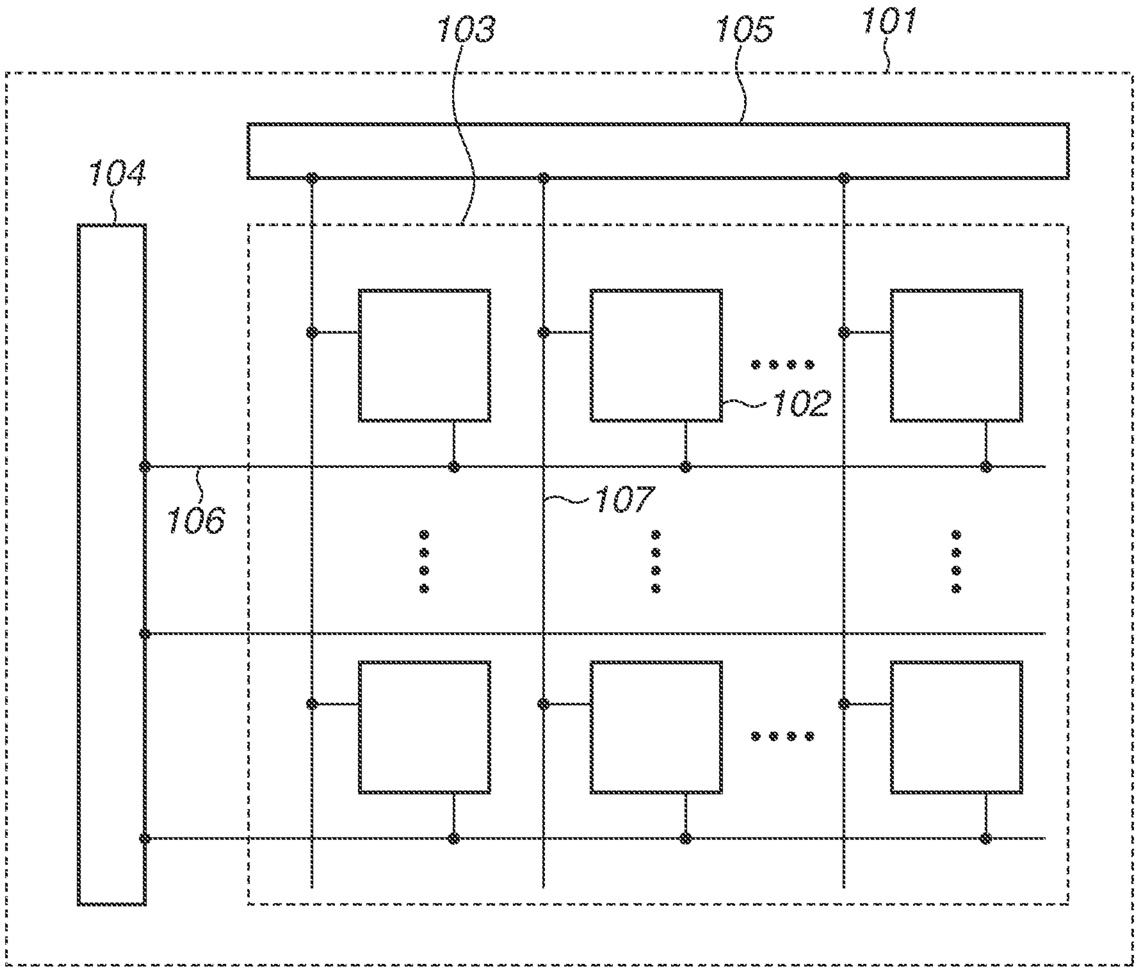
FIG. 1 is a diagram illustrating a configuration example of a light emitting apparatus according to a first exemplary embodiment.

Light emitting apparatuses according to exemplary embodiments of the disclosure will be described below with reference to the drawings. The following exemplary embodiments each demonstrate an example of the disclosure, and numerical values, shapes, materials, components, and arrangements and connections of components are not intended to limit the disclosure unless otherwise specified. In the following description and drawings, configurations common among a plurality of drawings are denoted by the same reference numerals. The common configurations will therefore be described by making cross-references to the plurality of drawings, and a description of the configurations denoted by the same reference numerals will be omitted as appropriate.

Figure 2:
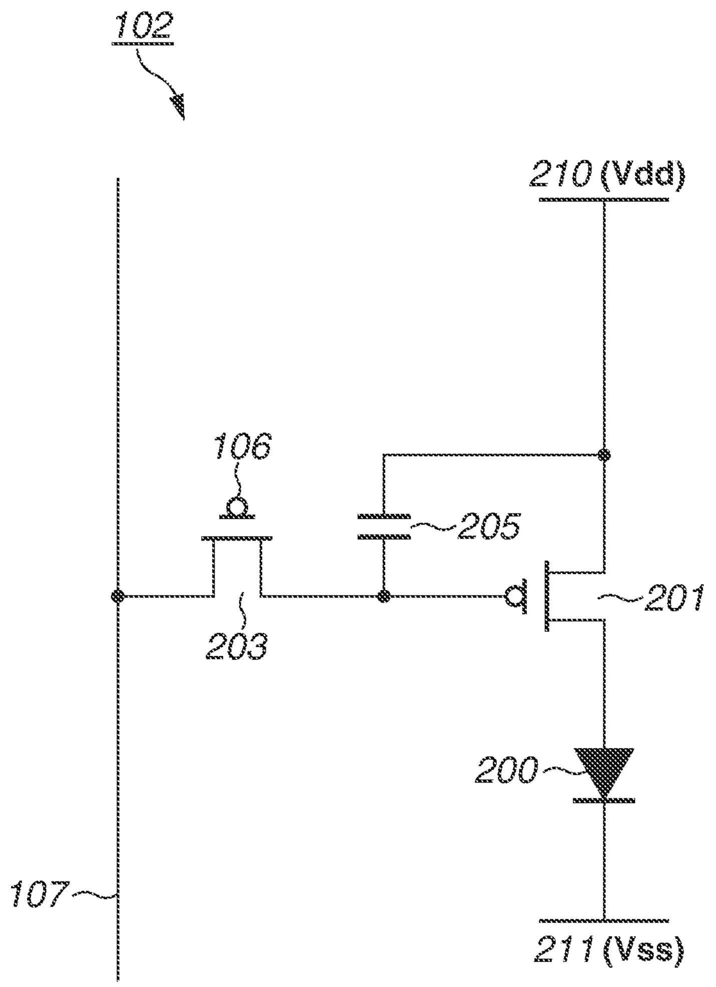
FIG. 2 is a circuit diagram illustrating a configuration example of a pixel in the light emitting apparatus of FIG. 1.

A light emitting apparatus according to a first exemplary embodiment of the disclosure will be described with reference to FIGS. 1 to 5. FIG. 1 is a diagram illustrating a configuration example of a light emitting apparatus 101 according to the first exemplary embodiment of the disclosure. FIG. 2 is a circuit diagram of a pixel 102 included in the light emitting apparatus 101.

The following description deals with a case where a driving transistor 201 is connected to the anode of a light emitting element 200 disposed in each pixel 102 of the light emitting apparatus 101, and all transistors disposed in the pixels 102 are P-type transistors. However, the configuration of the pixels 102 in the light emitting apparatus 101 according to the present exemplary embodiment is not limited thereto. For example, all the transistors or other devices may be reversed in polarity and conductivity type. As another example, the driving transistors may be P-type transistors and the other transistors N-type transistors. Potentials to be supplied and connections can be changed as appropriate based on the conductivity types and polarities of the light emitting elements and transistors included in the pixels 102 of the light emitting apparatus 101.

As illustrated in FIG. 1, an organic electroluminescence (EL) display apparatus that is an example of the light emitting apparatus 101 includes a pixel array section 103 and a driving section disposed around the pixel array section 103. The pixel array section 103 includes a plurality of pixels 102 two-dimensionally arranged in an array. As illustrated in FIG. 2, each pixel 102 includes a light emitting element 200. The light emitting element 200 includes a pair of electrodes consisting of an anode and a cathode, and an organic layer including a light emitting layer (organic light emitting layer) between the pair of electrodes. The organic layer may include one or more of a hole injection layer, a hole transport layer, an electron transport layer, and an electron injection layer as appropriate aside from the light emitting layer. In the present exemplary embodiment, the light emitting element 200 includes a light emitting layer made of an organic compound, and therefore can also be referred to as an organic light emitting element.

The driving section is circuitry for driving the pixels 102 disposed in the pixel array section 103. For example, the driving section includes a vertical scanning circuit 104 and a signal output circuit 105. The pixel array section 103 includes first scan lines 106 extending in a row direction (lateral direction in FIG. 1) to supply signals from the driving section to the pixels 102. The first scan lines 106 are laid for respective pixel rows of the pixels 102 arranged in an array. The pixel array section 103 also includes signal lines 107 extending in a column direction (vertical direction in FIG. 1) to supply signals from the driving section to the pixels 102. The signal lines 107 are laid for respective pixel columns of the pixels 102 arranged in an array.

The first scan lines 106 are connected to the output nodes of the respective corresponding pixel rows of the vertical scanning circuit 104. The signal lines 107 are connected to the output nodes of the respective corresponding pixel columns of the signal output circuit 105.

The vertical scanning circuit 104 supplies write control signals to the first scan lines 106 in writing luminance signals to the pixels 102 in the pixel array section 103. The signal output circuit 105 outputs, to the signal lines 107, luminance signals having voltages based on luminance information in making the light emitting elements 200 of the respective pixels 102 emit light. The luminance signals indicate the luminance of an image to be displayed on the light emitting apparatus 101 at the respective pixels 102, and is also referred to as video signals.

Circuit Configuration of Pixels

A circuit configuration of the pixels 102 according to the present exemplary embodiment will now be described with reference to FIG. 2. As illustrated in FIG. 2, each of the plurality of pixels 102 disposed in the pixel array section 103 includes a current path including a light emitting element 200 and a driving transistor 201 (first transistor), and a write transistor 203 (second transistor). The pixel 102 also includes a capacitive element 205. The numbers of transistors and capacitive elements and the combination of the conductivity types of the transistors here are merely an example, and the disclosure is not limited to this configuration.

In the following description, an expression that a transistor is connected between element A and element B means that one of main terminals of the transistor is connected to element A and the other main terminal is connected to element B. In other words, the expression that a transistor is connected between element A and element B does not cover a case where a control terminal of the transistor is connected to element A, one of the main terminals is not connected to element A, and the other main terminal is not connected to element B. As employed herein, a main terminal of a transistor refers to a diffusion region functioning as a source region or a drain region of the transistor. The control terminal of a transistor refers to the gate electrode of the transistor.

The driving transistor 201 and the write transistor 203 are a metal-oxide-semiconductor field-effect transistor (MOSFET) each. In the configuration illustrated in FIG. 2, one end of the current path including the light emitting element 200 and the driving transistor 201 is connected to a power supply potential 210 (Vdd), and the other end is connected to a power supply potential 211 (Vss). More specifically, the cathode of the light emitting element 200 is connected to the power supply potential Vss, and one of the main terminals (source region in the configuration of FIG. 2) of the driving transistor 201 is connected to the power supply potential Vdd. However, this is not restrictive. Other elements may be disposed between the power supply potential Vss and the light emitting element 200 and between the power supply potential Vdd and the driving transistor 201. Other elements may be disposed between the light emitting element 200 and the driving transistor 201. In the configuration illustrated in FIG. 2, the power supply potential Vdd is higher in potential than the power supply potential Vss.

One of the main terminals (drain region in the configuration of FIG. 2) of the driving transistor 201 is connected to the anode of the light emitting element 200. The control terminal (gate electrode) of the driving transistor 201 is connected to one of the main terminals (drain region in the configuration of FIG. 2) of the write transistor 203. The driving transistor 201 supplies a current based on the luminance signal to the light emitting element 200 to drive the light emitting element 200.

The write transistor 203 is disposed between the signal line 107 and the control terminal of the driving transistor 201. More specifically, one of the main terminals (drain region in the configuration of FIG. 2) of the write transistor 203 is connected to the control terminal of the driving transistor 201 as described above. The other main terminal (source region in the configuration of FIG. 2) of the write transistor 203 is connected to the signal line 107. The control terminal of the write transistor 203 is connected to the first scan line 106.

The capacitive element 205 is connected between the control terminal of the driving transistor 201 and the other main terminal (source region in the configuration FIG. 2) of the driving transistor 201.

The driving transistor 201 supplies a current from the power supply potential Vdd to the light emitting element 200 to make the light emitting element 200 emit light. More specifically, the driving transistor 201 supplies a current based on a signal voltage of the luminance signal held in the capacitive element 205 to the light emitting element 200. The light emitting element 200 is thus driven to emit light by current drive.

The write transistor 203 enters a conducting state (ON state) in response to a write control signal applied from the vertical scanning circuit 104 to its control terminal via the first scan line 106. The write transistor 203 thereby samples the signal voltage of the luminance signal based on the luminance information supplied from the signal output circuit 105 via the signal line 107, and writes the signal voltage into the pixel 102. The written signal voltage is applied to the control terminal of the driving transistor 201 and held in the capacitive element 205. In other words, the write transistor 203 is disposed to transmit the luminance signal for making the light emitting element 200 emit light with luminance based on the luminance information, and transmits the luminance signal to the control terminal of the driving transistor 201. In the present exemplary embodiment, the voltage value of the signal line 107 is input to the control terminal of the driving transistor 201 at a moment when the write transistor 203 enters the conducting state. The signal voltage determines the current value between the source and drain of the driving transistor 201, whereby the emission luminance of the light emitting element 200 is controlled.

Transistors Included in Each Pixel

Figure 3:
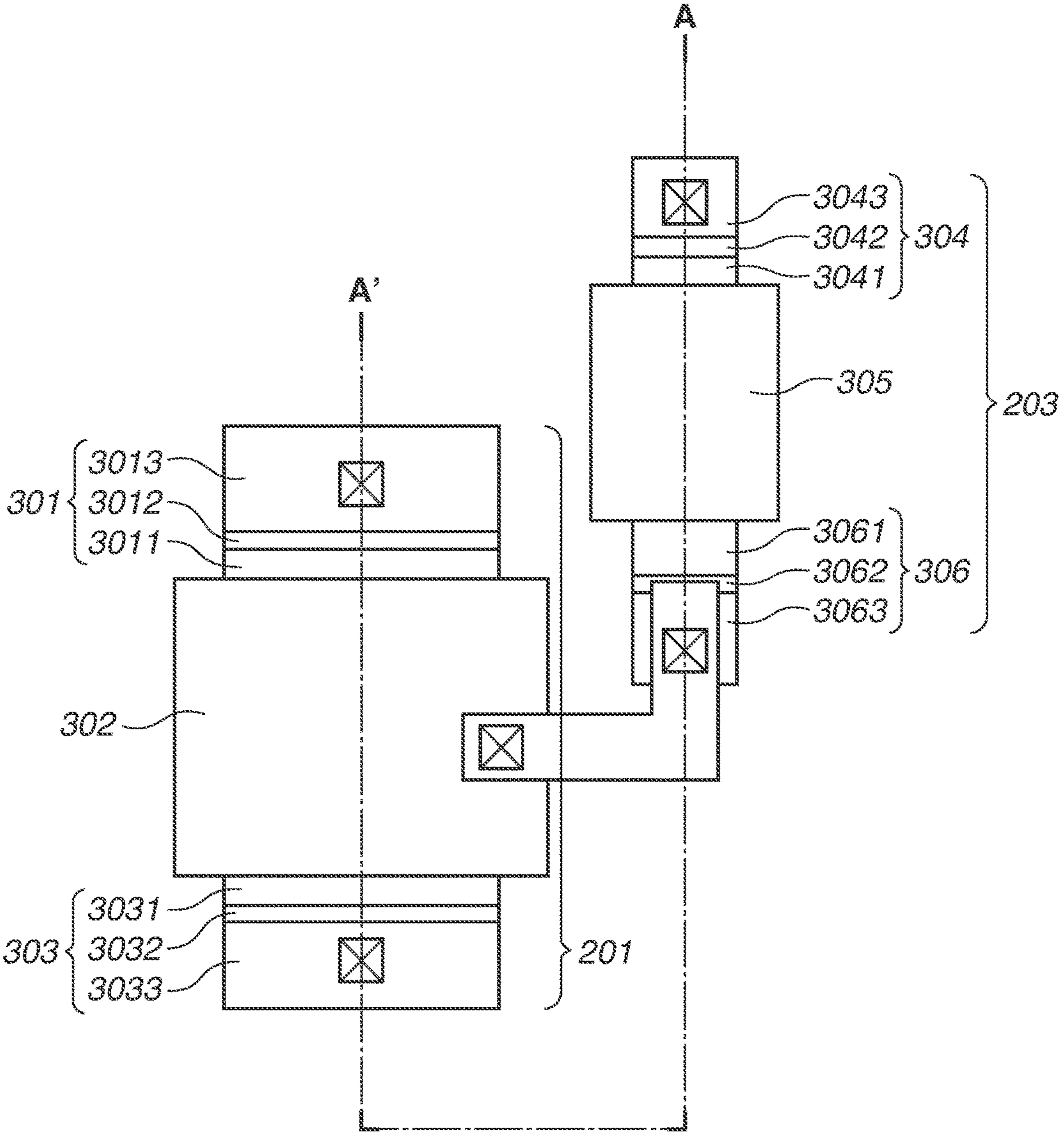
FIG. 3 is a plan view illustrating the configuration example of the pixel in the light emitting apparatus of FIG. 1.
Figure 4:
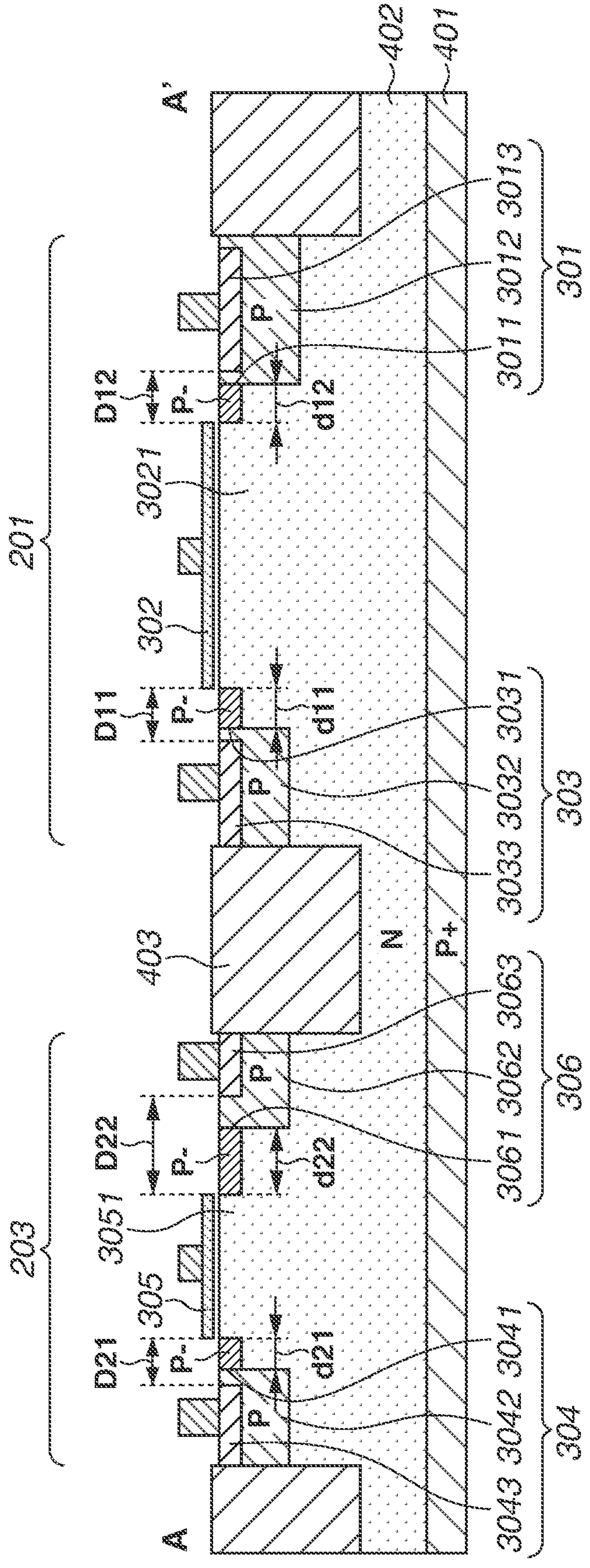
FIG. 4 is a sectional view illustrating the configuration example of the pixel in the light emitting apparatus of FIG. 1.

Details of the driving transistor 201 and the write transistor 203 included in the pixel 102 will now be described with reference to FIGS. 3 and 4. FIG. 3 is a plan view of the pixel 102. FIG. 4 is a sectional view taken along the line A-A' illustrated in FIG. 3.

The driving transistor 201 includes two P-type diffusion regions 301 and 303 disposed on the current path including the light emitting element 200 and the driving transistor 201. The driving transistor 201 is a P-channel metal-oxide-semiconductor (PMOS) transistor. The two diffusion regions 301 and 303 function as a main terminal (source region or drain region) each. In the configuration illustrated in FIGS. 3 and 4, the diffusion region 301 functions as the drain region of the driving transistor 201, and the diffusion region 303 functions as the source region of the driving transistor 201. The driving transistor 201 also includes a gate electrode 302 that functions as a control terminal. As described above, the luminance signal is transmitted from the write transistor 203 to the gate electrode 302. The gate electrode 302 is connected to one of the two terminals of the capacitive element 205. The diffusion region 303 is connected to the other terminal of the capacitive element 205. The diffusion region 301 is connected to the anode (not illustrated) of the light emitting element 200.

The write transistor 203 includes a gate electrode 305 functioning as a control terminal, and two P-type diffusion regions 304 and 306 functioning as main terminals. The write transistor 203 is a PMOS transistor. The diffusion region 306 is connected to the gate electrode 302, which is the control terminal of the driving transistor 201. The diffusion region 304 is connected to the signal line 107. The gate electrode 305 is connected to the first scan line 106. In the configuration illustrated in FIGS. 3 and 4, the diffusion region 304 functions as the source region of the write transistor 203, and the diffusion region 306 functions as the drain region of the write transistor 203.

As illustrated in FIG. 4, the driving transistor 201 and the write transistor 203 are both disposed on an N-type well 402 located on a P-type substrate 401. The power supply potential Vdd is applied to the N-type well 402 via a not-illustrated well contact portion. The driving transistor 201 and the write transistor 203 are separated by an element isolation portion 403 (FIG. 4). The element isolation portion 403 may be implemented by using any appropriate isolation method, such as shallow trench isolation (STI), local oxidation of silicon (LOCOS) isolation, deep trench isolation (DTI), and isolation using an N-type diffusion layer. Being a top view, FIG. 3 does not illustrate all the connections in the circuit diagram of FIG. 2, but the circuitry illustrated in FIG. 2 is implemented by stacking wiring layers on top of the configuration of FIG. 3 and establishing connections using wiring patterns and contact plugs.

Write Transistor

The two diffusion regions 304 and 306 of the write transistor 203 will now be described.

The diffusion region 306 functioning as the drain region of the write transistor 203 includes a compound region 3063 (first region). The diffusion region 306 includes a P region 3062 (second region) having a higher resistivity than that of the compound region 3063 between the compound region 3063 and a channel region 3051 of the write transistor 203. The diffusion region 306 also includes a P-region 3061 (fifth region) having a higher resistivity than that of the P region 3062 (second region) between the P region 3062 and the channel region 3051. In other words, the diffusion region 306 is configured such that the P-region 3061, the P region 3062, and the compound region 3063 are arranged in this order from the channel region 3051 side along the direction of current flow. That is, the diffusion region 306 includes the P region 3062 located between the P-region 3061 and the compound region 3063. In descending order of resistivity, the regions included in the diffusion region 306 are the P-region 3061, the P region 3062, and the compound region 3063. Here, resistivity refers to an electrical resistivity. The same applies to the following.

The diffusion region 304 functioning as the source region of the write transistor 203 includes a compound region 3043 (third region). The diffusion region 304 also includes a P region 3042 (fourth region) having a higher resistivity than that of the compound region 3043 between the compound region 3043 and the channel region 3051 of the write transistor 203. The diffusion region 304 further includes a P-region 3041 (sixth region) having a higher resistivity than that of the P region 3042 (fourth region) between the P region 3042 and the channel region 3051. In other words, the diffusion region 304 is configured such that the P-region 3041, the P region 3042, and the compound region 3043 are arranged in this order from the channel region 3051 side along the direction of current flow. That is, the diffusion region 304 includes the P region 3042 located between the P-region 3041 and the compound region 3043. In descending order of resistivity, the regions included in the diffusion region 304 are the P-region 3041, the P region 3042, and the compound region 3043.

As the diffusion regions of the write transistor 203 that is a P-type transistor, the P regions 3042 and 3062 and the P-regions 3041 and 3061 are made of semiconductors of the same conductivity type. The P regions 3042 and 3062 and the P-regions 3041 and 3061 are made of semiconductors of the opposite conductivity type to that of the channel region 3051. In the present exemplary embodiment, the P regions 3042 and 3062 and the P-regions 3041 and 3061 are semiconductor regions doped with P-type impurities. The diffusion regions 304 and 306 have a lightly doped drain (LDD) structure where the P-regions 3041 and 3061 on the channel region 3051 side have an impurity concentration lower than that of the P regions 3042 and 3062. This makes the resistivity of the P-regions 3041 and 3061 higher than that of the P regions 3042 and 3062 as described above. The compound regions 3043 and 3063 may have an impurity concentration similar to that of the P regions 3042 and 3062.

The compound regions 3043 and 3063 are made of a semiconductor-metal compound. In the present exemplary embodiment, the P regions 3042 and 3062 and the P-regions 3041 and 3061 are regions formed of silicon. The compound regions 3043 and 3063 are silicide regions formed by making part of the P regions 3042 and 3062 react with metal. In other words, the compound region 3043 is made of a compound of the semiconductor that is the main component of the P region 3042 with the metal. The compound region 3063 is made of a compound of the semiconductor that is the main component of the P region 3062 with the metal. The compound regions 3043 and 3063 thus have a lower resistivity than those of the P regions 3042 and 3062 and the P-regions 3041 and 3061. The write transistor 203 is connected with contact plugs at the compound regions 3043 and 3063 thus reduced in resistance, and connected to external elements.

Driving Transistor

The two diffusion regions 301 and 303 of the driving transistor 201 will now be described.

Similarly to the diffusion region 306 functioning as the drain region of the write transistor 203, the diffusion region 301 functioning as the drain region of the driving transistor 201 includes a compound region 3013, a P region 3012, and a P-region 3011. The diffusion region 301 is configured such that the P-region 3011 (eleventh region), the P region 3012 (eighth region), and the compound region 3013 (seventh region) are arranged in this order from a channel region 3021 side of the driving transistor 201 along the direction of current flow. In other words, the diffusion region 301 includes the P region 3012 located between the P-region 3011 and the compound region 3013. In descending order of resistivity, the regions included in the diffusion region 301 are the P-region 3011, the P region 3012, and the compound region 3013.

Similarly to the diffusion region 304 functioning as the source region of the write transistor 203, the diffusion region 303 functioning as the source region of the driving transistor 201 includes a compound region 3033, a P region 3032, and a P-region 3031. The diffusion region 303 is configured such that the P-region 3031 (twelfth region), the P region 3032 (tenth region), and the compound region 3033 (ninth region) are arranged in this order from the channel region 3021 side of the driving transistor 201 along the direction of current flow. In other words, the diffusion region 303 includes the P region 3032 located between the P-region 3031 and the compound region 3033. In descending order of resistivity, the regions included in the diffusion region 303 are the P-region 3031, the P region 3032, and the compound region 3033.

As the diffusion regions of the driving transistor 201 that is a P-type transistor, the P regions 3032 and 3012 and the P-regions 3031 and 3011 are made of semiconductors of the same conductivity type. The P regions 3032 and 3012 and the P-regions 3031 and 3011 are made of semiconductors of the opposite conductivity type to that of the channel region 3021. In the present exemplary embodiment, the P regions 3032 and 3012 and the P-regions 3031 and 3011 are semiconductor regions doped with P-type impurities. The diffusion regions 301 and 303 have an LDD structure where the P-regions 3031 and 3011 on the channel region 3021 side have a lower impurity concentration than that of the P regions 3032 and 3012. This makes the resistivity of the P-regions 3031 and 3011 higher than that of the P regions 3032 and 3012 as described above. The compound regions 3033 and 3013 may have an impurity concentration similar to that of the P regions 3032 and 3012.

The compound regions 3033 and 3013 are made of a semiconductor-metal compound. In the present exemplary embodiment, the P regions 3032 and 3012 and the P-regions 3031 and 3011 are regions formed of silicon. The compound regions 3033 and 3013 are silicide regions formed by making part of the P regions 3032 and 3012 react with metal. In other words, the compound region 3033 is made of a compound of the semiconductor that is the main component of the P region 3032 with the metal. The compound region 3013 is made of a compound of the semiconductor that is the main component of the P region 3012 with the metal. The compound regions 3033 and 3013 thus have a lower resistivity than those of the P regions 3032 and 3012 and the P-regions 3031 and 3011. The driving transistor 201 are connected with contact plugs at the compound regions 3033 and 3013 thus reduced in resistance, and connected to external elements.

Lengths of Regions in Transistors

Figure 5:
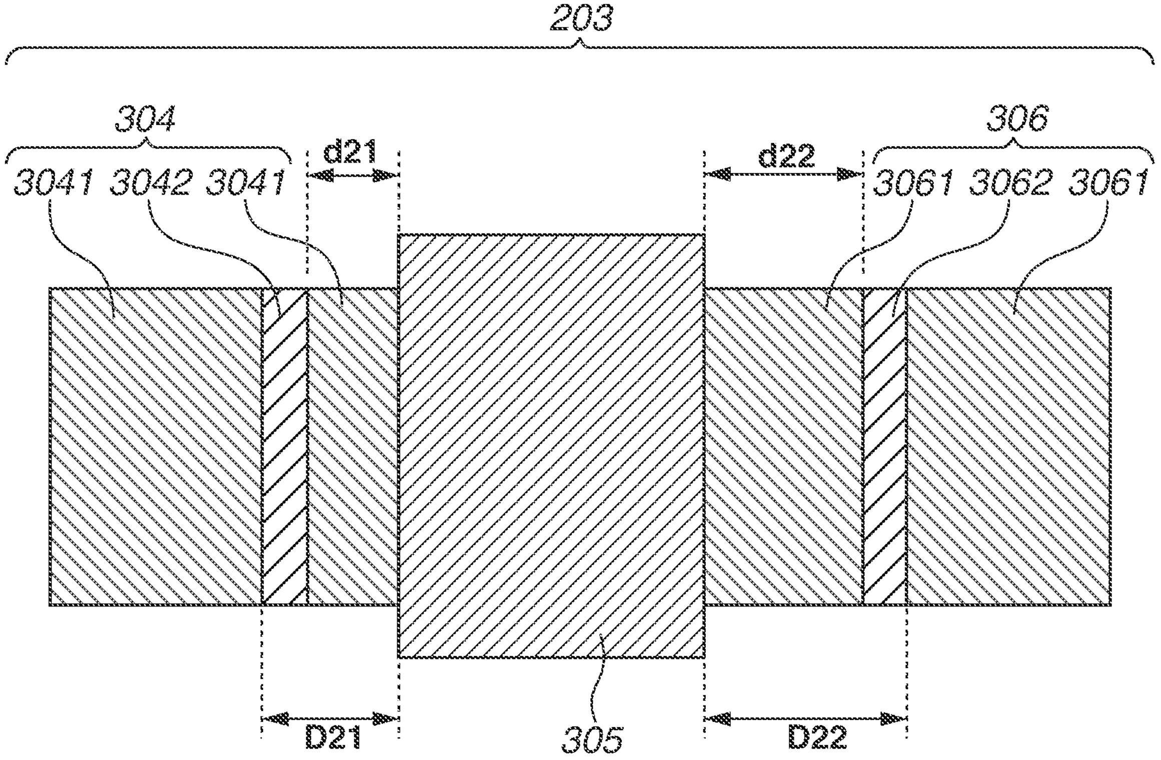
FIG. 5 is a schematic diagram illustrating a write transistor extracted from FIG. 3 in a simplified form.

The lengths of the regions included in the diffusion regions of the driving transistor 201 and the write transistor 203 in a plan view perpendicular to the substrate 401 will now be described with reference to FIGS. 3 to 5.

In a plan view of the driving transistor 201 perpendicular to the substrate 401, the length of the current path from the end of the gate electrode 302 to the end of the compound region 3033 will be denoted by D11. In the plan view perpendicular to the substrate 401, the length of the current path from the end of the gate electrode 302 to the end of the compound region 3013 will be denoted by D12. In other words, the length of the current path from the source region-side compound region of the driving transistor 201 to the gate electrode 302 in the plan view is D11, and the length of the current path from the drain region-side compound region of the driving transistor 201 to the gate electrode 302 is D12. If there is a plurality of current paths of different lengths between a compound region and the gate electrode, the length of the shortest current path may be employed. If, as illustrated in FIG. 3, the portions located between the compound regions of the source and drain regions and the gate electrode are straight, the foregoing lengths may refer to the distances between the ends. In the present exemplary embodiment, the length D11 of the current path from the end of the gate electrode 302 to the end of the compound region 3033 is the length of the P region 3032 and the P-region 3031 between the end of the gate electrode 302 and the end of the compound region 3033 along the direction of current flow. The length D12 of the current path from the end of the gate electrode 302 to the end of the compound region 3013 is the length of the P region 3012 and the P-region 3011 between the end of the gate electrode 302 and the end of the compound region 3013 along the direction of current flow. The same applies to other transistors. In the plan view of the driving transistor 201 perpendicular to the substrate 401, the length of the current path in the P-region 3031 will be denoted by d11, and the length of the current path in the P-region 3011 will be denoted by d12. In other words, the length of the source region-side LDD region of the driving transistor 201 along the direction of current flow is d11, and the length of the drain region-side LDD region of the driving transistor 201 along the direction of current flow is d12.

In a plan view of the write transistor 203 perpendicular to the substrate 401, the length of the current path from the end of the gate electrode 305 to the end of the compound region 3043 will be denoted by D21. In the plan view perpendicular to the substrate 401, the length of the current path from the end of the gate electrode 305 to the end of the compound region 3063 will be denoted by D22. In other words, the length of the current path from the source region-side compound region of the write transistor 203 to the gate electrode 305 in the plan view is D21, and the length of the current path from the drain region-side compound region of the write transistor 203 to the gate electrode 305 is D22. If there is a plurality of current paths of different lengths between a compound region and the gate electrode, the length of the shortest current path may be employed. If, as illustrated in FIG. 3, the portions located between the compound regions of the source and drain regions and the gate electrode are straight, the foregoing lengths may refer to the distances between the ends. In the plan view of the write transistor 203 perpendicular to the substrate 401, the length of the current path in the P-region 3041 will be denoted by d21, and the length of the current path in the P-region 3061 will be denoted by d22. In other words, the length of the source region-side LDD region of the write transistor 203 along the direction of current flow is d21, and the length of the drain region-side LDD region of the write transistor 203 along the direction of current flow is d22. FIG. 5 is a schematic diagram illustrating the write transistor 203 extracted from FIG. 3 in a simplified form.

The P-regions 3011, 3031, 3041, and 3061 may be extended to below the P regions 3012, 3032, 3042, and 3062. Even in such a case, the length of the P-region in each diffusion region refers to the length of the P-region between the channel region-side end of the P region included in the same diffusion region and the P region-side end of the channel region. For example, the length d12 of the P-region 3011 is the length of the P-region 3011 between the channel region 3021-side end of the P region 3012 and the P region 3012-side end of the channel region 3021. The same applies to the other P-regions. In other words, as employed herein, the length of a P-region can be the shortest distance between the P region included in the same diffusion region as is the P-region and the portion where the channel region of the transistor is formed.

In the present exemplary embodiment, the channel region-side end of a P-region meets the end of the gate electrode disposed on the channel region. The length of the P-region is therefore the length between the end of the P region adjoining the P-region and the P region-side end of the gate electrode in the plan view. The P-regions 3011 and 3031 may be extended to below the gate electrode 302. The P-regions 3041 and 3061 may be extended to below the gate electrode 305. Even in such a case, the length between the end of the P region adjoining a P-region and the P region-side end of the gate electrode in the plan view may be regarded as the length of the P-region if the length of the portion of the P-region under the gate electrode is sufficiently small.

If the write transistor 203 is in an OFF state, the potential of the diffusion region 306 functioning as the drain region of the write transistor 203 and the potential of the gate electrode 302 of the driving transistor 201 are floating. The potential of the gate electrode 302 of the driving transistor 201 is equal to that of the diffusion region 306 functioning as the drain region of the write transistor 203. The potential of the gate electrode 302 of the driving transistor 201 determines the drain current of the driving transistor 201 and determines the luminance of the light emitting element 200. If the potential of the diffusion region 306 functioning as the drain region of the write transistor 203 changes, the magnitude of the drain current of the driving transistor 201 thus changes and the luminance of the light emitting element 200 changes as well.

To stabilize the luminance of the light emitting element 200, the potential of the drain region of the write transistor 203 is therefore stable.

With the write transistor 203 in the OFF state, the potential of the gate electrode 305 and the potential of the well 402 are different from that of the diffusion region 306 functioning as the drain region. The potential differences can generate an electric field at least either between the gate electrode 305 and the diffusion region 306 functioning as the drain region or between the well 402 and the diffusion region 306 functioning as the drain region. If a leakage current (hereinafter, also referred to as an off leakage current) occurs due to the electric field, the potential of the diffusion region 306 functioning as the drain region of the write transistor 203 changes, and the potential of the gate electrode 305 of the driving transistor 201 changes accordingly. If the leakage current is large, the potential of the gate electrode 305 of the driving transistor 201 approaches the potential of the diffusion region 303 functioning as the source region of the driving transistor 201. This makes it difficult for current to flow through the light emitting element 200. Light emission from pixels 102 causing a leakage current is thereby reduced, and the portions of a display image displayed on the light emitting apparatus 101 corresponding to such pixels 102 get darker than their original brightness. In some cases, no current flows through the light emitting elements 200, the pixels 102 do not emit light, and the portions of the display image corresponding to the pixels 102 appear black, depending on the magnitude of the leakage current. The occurrence of a leak current in the write transistor 203 in the OFF state thus destabilizes the emission luminance of the light emitting element 200, and eventually lowers the emission or display quality of the light emitting apparatus 101.

In the present exemplary embodiment, the write transistor 203 is configured such that the length D22 of the current path from the end of the gate electrode 305 to the end of the compound region 3063 is greater than the length D21 of the current path from the end of the gate electrode 305 to the end of the compound region 3043. That is, D22>D21 holds. In other words, the length of the current path from the drain region-side compound region of the write transistor 203 to the gate electrode 305 is greater than the length of the current path from the source region-side compound region of the write transistor 203 to the gate electrode 305. The physical distance between the low-resistivity compound region 3063 of the diffusion region 306 functioning as the drain region, connected to the gate electrode 302 of the driving transistor 201 via contact plugs, and the gate electrode 305 can thereby be increased. The physical distance between the compound region 3063 and the portion of the well 402 located directly below the gate electrode 305 (i.e., channel region 3051) can also be increased. By using such a configuration, the present exemplary embodiment can reduce the electric field occurring in the drain region of the write transistor 203 between the gate electrode 305 and the compound region 3063 and the electric field occurring between the channel region 3051 and the compound region 3063. More specifically, the foregoing electric fields in the drain region of the write transistor 203 can be made smaller than electric fields occurring in the source region of the write transistor 203. Such a field-reducing configuration can reduce the occurrence of an off leakage current in the drain region of the write transistor 203. The potential of the gate electrode 302 of the driving transistor 201 can thereby be stabilized, and stabilize the emission luminance of the light emitting element 200. As a result, the emission or display quality of the light emitting apparatus 101 can be improved.

In one embodiment, the length D22 is greater than the length d22 of the P-region 3061 of the write transistor 203. That is, it is that D22>d22 hold. In other words, the length of the current path from the drain region-side compound region of the write transistor 203 to the gate electrode 305 is greater than the length of the drain region-side LDD region of the write transistor 203. The foregoing electric fields in the drain region of the write transistor 203 can further be reduced by such a configuration. This can further reduce the occurrence of an off leakage current in the drain region of the write transistor 203 and further stabilize the emission luminance of the light emitting element 200. As a result, the emission or display quality of the light emitting apparatus 101 can further be improved.

In one embodiment, the length D22 is greater than the length D11 of the current path from the end of the gate electrode 302 of the driving transistor 201 to the end of the compound region 3033. The length D22 is also greater than the length D12 of the current path from the end of the gate electrode 302 of the driving transistor 201 to the end of the compound region 3013. That is, it is that D22>D11 and D22>D12 hold. In other words, of the lengths of the current paths from the ends of the gate electrodes to the ends of the compound regions of the transistors constituting the pixel 102, the length (length D22) of the write transistor 203 is the greatest. The foregoing electric fields in the drain region of the write transistor 203 can further be reduced by such a configuration. This can further reduce the occurrence of an off leakage current in the drain region of the write transistor 203 and further stabilize the emission luminance of the light emitting element 200. As a result, the emission or display quality of the light emitting apparatus 101 can further be improved.

In another embodiment, the length d22 is greater than the lengths d11 and d12 of the LDD regions of the driving transistor 201 and greater than the length d21 of the source region-side LDD region of the write transistor 203. That is, it is that d22>d11, d22>d12, and d22>d21 hold. In other words, the length of the drain region-side LDD region of the write transistor 203 is the greatest of the lengths of the LDD regions of the transistors constituting the pixel 102. The foregoing electric fields in the drain region of the write transistor 203 can further be reduced by such a configuration. This can further reduce the occurrence of an off leakage current in the drain region of the write transistor 203 and further stabilize the emission luminance of the light emitting element 200. As a result, the emission or display quality of the light emitting apparatus 101 can further be improved.

In one embodiment, the length D12 is greater than the length D11 of the current path from the end of the gate electrode 302 of the driving transistor 201 to the end of the compound region 3033. That is, it is that D12>D11 hold. In other words, the length from the drain region-side compound region of the driving transistor 201 to the gate electrode 302 is greater than the length of the current path from the source region-side compound region to the gate electrode 302. This can further stabilize the emission luminance of the light emitting element 200. As a result, the emission or display quality of the light emitting apparatus 101 can further be improved.

Figure 6:
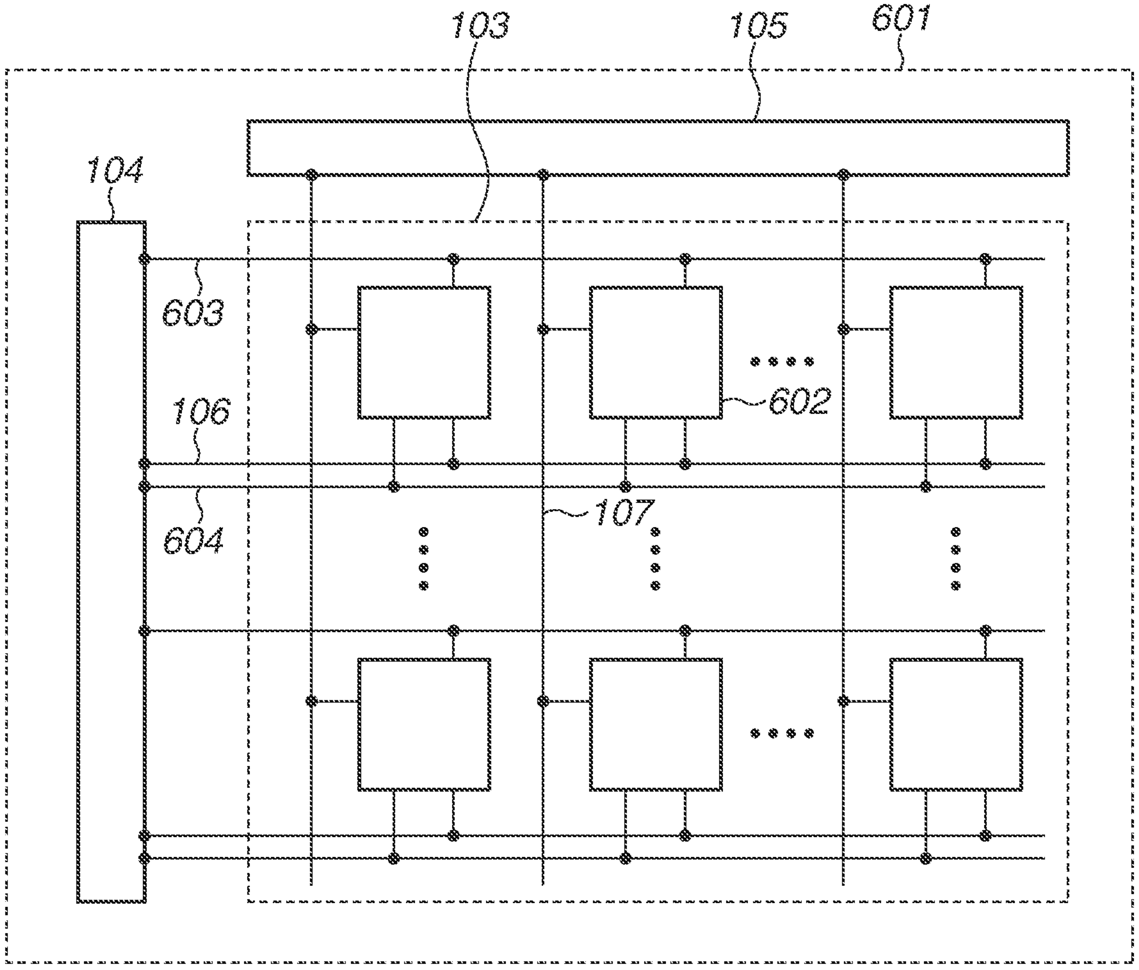
FIG. 6 is a diagram illustrating a configuration example of a light emitting apparatus according to a second exemplary embodiment.
Figure 7:
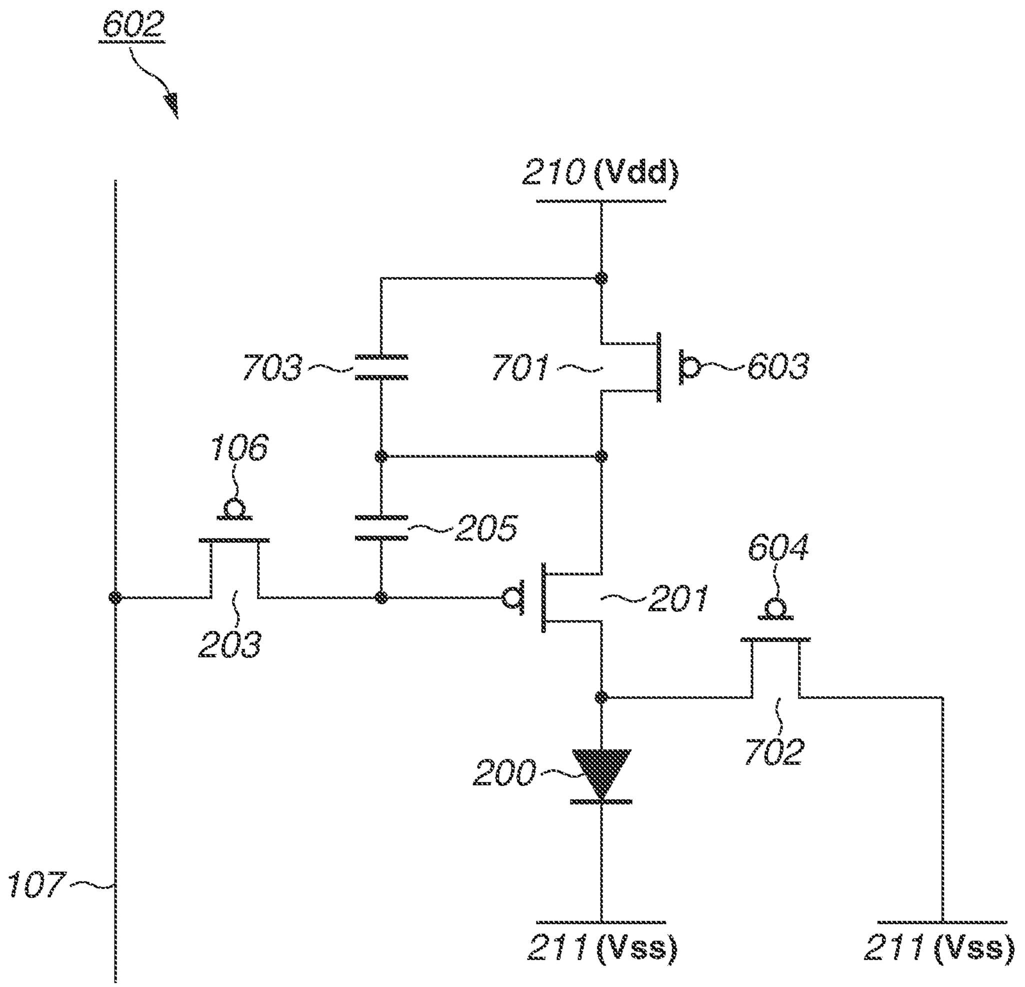
FIG. 7 is a circuit diagram illustrating a configuration example of a pixel in the light emitting apparatus of FIG. 6.

A light emitting apparatus according to a second exemplary embodiment of the disclosure will be described with reference to FIGS. 6 to 9. FIG. 6 is a diagram illustrating a configuration example of a light emitting apparatus 601 according to the second exemplary embodiment of the disclosure. FIG. 7 is a circuit diagram of a pixel 602 included in the light emitting apparatus 601. The present exemplary embodiment differs from the first exemplary embodiment mainly in that each pixel 602 included in the light emitting apparatus 601 further includes an emission control transistor 701 (third transistor) and a reset transistor 702 (fourth transistor). In other words, a pixel according to the present exemplary embodiment includes four transistors while a pixel according to the first exemplary embodiment includes two transistors. Differences in the configuration of the light emitting apparatus 601 of the present exemplary embodiment from those of the foregoing light emitting apparatus 101 will mainly be described below.

As illustrated in FIG. 6, an organic EL display apparatus that is an example of the light emitting apparatus 601 includes a pixel array section 103 and a driving section disposed around the pixel array section 103. The light emitting apparatus 601 further includes second scan lines 603 and third scan lines 604 in addition to the configuration of the first exemplary embodiment. Similarly to the first scan lines 106, the second scan lines 603 and the third scan lines 604 extend along the row direction (lateral direction in FIG. 6), and are disposed for respective pixel rows of pixels 602 arranged in an array. Similarly to the first scan lines 106, the second scan lines 603 and the third scan lines 604 are connected to the output nodes of the respective corresponding pixel rows of the vertical scanning circuit 104. The second scan lines 603 are scan lines for switching the emission control transistors 701 between conducting and non-conducting to make the light emitting elements 200 emit light. The second scan lines 603 supply emission control signals to the respective pixels 602. The third scan lines 604 are scan lines for switching the reset transistors 702 between conducting and non-conducting. The third scan lines 604 supplies reset signals to the respective pixels 602.

Circuit Configuration of Pixels

A circuit configuration of the pixels 602 according to the present exemplary embodiment will now be described with reference to FIG. 7. As illustrated in FIG. 7, each of the plurality of pixels 602 arranged in the pixel array section 103 includes an emission control transistor 701 (third transistor) disposed on a current path including a light emitting element 200 and a driving transistor 201 (first transistor). The pixel 602 also includes a reset transistor 702 (fourth transistor)

connected between the anode of the light emitting element 200, as well as one of the main terminals of the driving transistor 201, and a power supply potential Vss. The pixel 602 includes two capacitive elements 205 and 703. The four transistors (first to fourth transistors) included in the pixel 602 are an MOSFET each.

The emission control transistor 701 is disposed between the driving transistor 201 and a power supply potential Vdd for supplying a driving current to the driving transistor 201. More specifically, one of the main terminals (source region in the configuration of FIG. 7) of the emission control transistor 701 is connected to the power supply potential Vdd as described above.

The emission control transistor 701 enters a conducting state in response to an emission control signal applied from the vertical scanning circuit 104 to its control terminal via the second scan line 603, whereby supply of the current from the power supply potential Vdd to the driving transistor 201 is permitted. This enables the driving transistor 201 to drive the light emitting element 200. In other words, the emission control transistor 701 functions as a switch element for controlling emission or non-emission of the light emitting element 200 by controlling the conducting state of the current path.

In such a manner, a period where the light emitting element 200 is in a non-emission state (non-emission period) is provided by the switching operation of the emission control transistor 701, whereby the ratio between an emission period where the light emitting element 200 emits light and the non-emission period can be controlled (duty control). The duty control can reduce an afterimage blur due to emission of the light emitting element 200 in each pixel 602 throughout a frame period, and can improve the image quality of a moving image in particular. The emission control transistor 701 can also be referred to as an emission period control transistor for controlling the emission period of the light emitting element 200.

One of the main terminals (source region in the configuration of FIG. 7) of the reset transistor 702 is connected to the anode of the light emitting element 200 and one of the main terminals (drain region in the configuration of FIG. 7) of the driving transistor 201. The other main terminal (drain region in the configuration of FIG. 7) of the reset transistor 702 is connected to the power supply potential Vss. The control terminal of the reset transistor 702 is connected to the third scan line 604. In a non-emission period, the reset transistor 702 is brought into a conducting state, whereby the anode of the light emitting element 200 is connected to the power supply potential Vss and the two terminals of the light emitting element 200 are short-circuited.

This can bring the light emitting element 200 into a non-emission state (reset operation). The provision of the reset transistor 702 in the pixel 602 ensures black display of the light emitting element 200 in the non-emission period, whereby a light emitting apparatus 601 having a high contrast ratio can be implemented.

Transistors Included in Each Pixel

Figure 8:
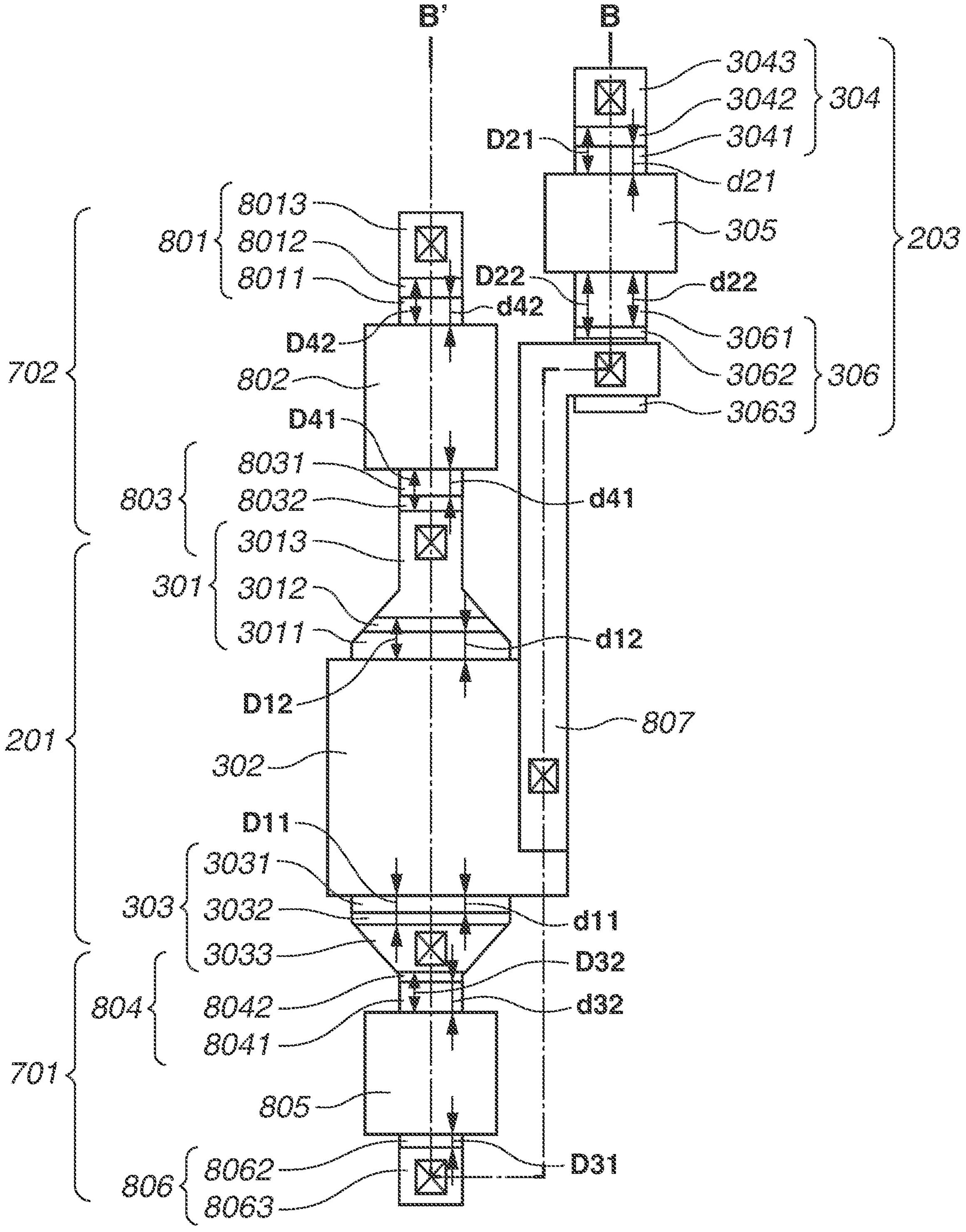
FIG. 8 is a plan view illustrating the configuration example of the pixel in the light emitting apparatus of FIG. 6.
Figure 9:
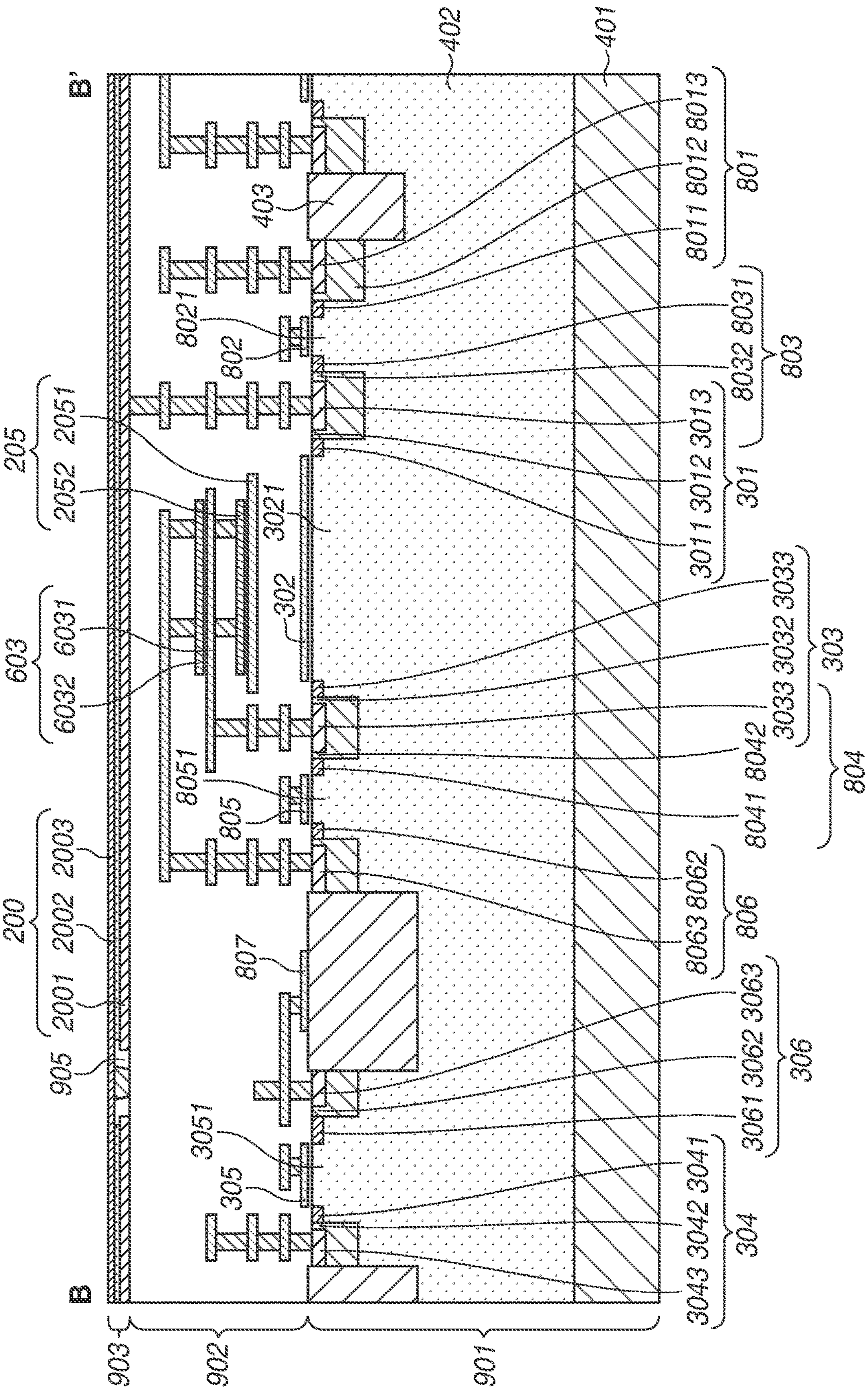
FIG. 9 is a sectional view illustrating the configuration example of the pixel in the light emitting apparatus of FIG. 6.

Details of the transistors included in the pixel 602 will now be described with reference to FIGS. 8 and 9. FIG. 8 is a plan view of the pixel 602. FIG. 9 is a sectional view taken along the line B-B' illustrated in FIG. 8.

The emission control transistor 701 includes two P-type diffusion regions 804 and 806 disposed on the current path. The emission control transistor 701 is a PMOS transistor. The two diffusion regions 804 and 806 function as a main terminal (source region or drain region) each. In the configuration illustrated in FIGS. 8 and 9, the diffusion region 804 functions as a drain region of the emission control transistor 701. The diffusion region 806 functions as a source region of the emission control transistor 701. The emission control transistor 701 also includes a gate electrode 805 functioning as a control terminal. An emission control signal is transmitted from the vertical scanning circuit 104 to the gate electrode 805 via the second scan line 603 as described above.

In the circuit illustrated in FIG. 8, the drain of the emission control transistor 701 and the source of the driving transistor 201 constitute the same terminal. In the present exemplary embodiment, the emission control transistor 701 and the driving transistor 201 share a diffusion region. More specifically, the compound region 3033 included in the diffusion region 303 functioning as the source region of the driving transistor 201 is also included in the diffusion region 804 functioning as the drain region of the emission control transistor 701. However, this is not restrictive. The diffusion region of the driving transistor 201 and the diffusion region of the emission control transistor 701 may be independent of each other.

The reset transistor 702 includes two P-type diffusion regions 801 and 803. The reset transistor 702 is a PMOS transistor. The two diffusion regions 801 and 803 function as a main terminal (source region or drain region) each. In the configuration illustrated in FIGS. 8 and 9, the diffusion region 801 functions as a drain region of the reset transistor 702. The diffusion region 803 functions as a source region of the reset transistor 702. The reset transistor 702 also includes a gate electrode 802 functioning as a control terminal. A rest signal is transmitted from the vertical scanning circuit 104 to the gate electrode 802 via the third scan line 604 as described above.

In the circuit of FIG. 8, the source of the reset transistor 702 and the drain of the driving transistor 201 constitute the same terminal. In the present exemplary embodiment, the reset transistor 702 and the driving transistor 201 share a diffusion region. More specifically, the compound region 3013 included in the diffusion region 301 functioning as the drain region of the driving transistor 201 is also included in the diffusion region 803 functioning as the source region of the reset transistor 702. However, this is not restrictive. The diffusion region of the driving transistor 201 and the diffusion region of the reset transistor 702 may be independent of each other.

As illustrated in FIG. 9, the emission control transistor 701 and the reset transistor 702 are also disposed on the N-type well 402 located on the P-type substrate 401. Transistors not sharing terminals are separated by element isolation portions 403. The element isolation portions 403 according to the present exemplary embodiment have an STI structure and are formed of silicon oxide. The element isolation portions 403 are formed in 0.2 to 1.0 μm in the depth direction from the surface of a semiconductor substrate 901.

Being a top view, FIG. 8 does not illustrate all the connections in the circuit diagram of FIG. 7. The circuitry illustrated in FIG. 7 is implemented by stacking wiring layers on top of the configuration of FIG. 8 and establishing connections using wiring patterns and contact plugs.

Emission Control Transistor

The two diffusion regions 804 and 806 of the emission control transistor 701 will now be described.

Similarly to the diffusion region 306 functioning as the drain region of the write transistor 203, the diffusion region 804 functioning as the drain region of the emission control transistor 701 includes the compound region 3033, a P region 8042, and a P-region 8041. The diffusion region 804 is configured such that the P-region 8041 (seventeenth region), the P region 8042 (fourteenth region), and the compound region 3033 (thirteenth region) are arranged in this order from a channel region 8051 side of the emission control transistor 701 along the direction of current flow. In other words, the diffusion region 804 includes the P region 8042 located between the P-region 8041 and the compound region 3033. In descending order of resistivity, the regions included in the diffusion region 804 are the P-region 8041, the P region 8042, and the compound region 3033.

The diffusion region 806 functioning as the source region of the emission control transistor 701 includes a compound region 8063 and a P region 8062. The diffusion region 806 is configured such that the P region 8062 (sixteenth region) and the compound region 8063 (fifteenth region) are arranged in this order from the channel region 8051 side of the emission control transistor 701 along the direction of current flow. In descending order of resistivity, the regions included in the diffusion region 806 are the P region 8062 and the compound region 8063.

The P regions 8042 and 8062 and the P-region 8041 are made of semiconductors of the same conductivity type as the diffusion regions of the emission control transistor 701 that is a P-type transistor.

The P regions 8042 and 8062 and the P-region 8041 are made of semiconductors of the opposite conductivity type to that of the channel region 8051. In the present exemplary embodiment, the P regions 8042 and 8062 and the P-region 8041 are semiconductor regions doped with P-type impurities. The diffusion region 804 has an LDD structure where the P-region 8041 on the channel region 8051 side has a lower impurity concentration than that of the P region 8042. This makes the resistivity of the P-region 8041 higher than that of the P region 8042 as described above. The compound regions 3033 and 8063 may have an impurity concentration similar to that of the P regions 8042 and 8062.

The compound regions 3033 and 8063 are made of a semiconductor-metal compound. In the present exemplary embodiment, the P regions 8042 and 8062 and the P-region 8041 are regions formed of silicon. The compound regions 3033 and 8063 are silicide regions formed by making part of the P regions 8042 and 8062 react with metal. In other words, the compound region 3033 is made of a compound of the semiconductor that is the main component of the P region 8042 with the metal. The compound region 8063 is made of a compound of the semiconductor that is the main component of the P region 8062 with the metal. The compound regions 3033 and 8063 thus have a lower resistivity than those of the P region 8042 and 8062 and the P-region 8041. The emission control transistor 701 is connected with contact plugs at the compound regions 3033 and 8063 thus reduced in resistance, and connected to external elements.

Reset Transistor

The two diffusion regions 801 and 803 of the reset transistor 702 will now be described.

Similarly to the diffusion region 306 functioning as the drain region of the write transistor 203, the diffusion region 801 functioning as the drain region of the reset transistor 702 includes a compound region 8013, a P region 8012, and a P-region 8011. The diffusion region 801 is configured such that the P-region 8011 (twenty-third region), the P region 8012 (twentieth region), and the compound region 8013 (nineteenth region) are arranged in this order from a channel region 8021 side of the reset transistor 702 along the direction of current flow. In other words, the diffusion region 801 includes the P region 8012 located between the P-region 8011 and the compound region 8013. In descending order of resistivity, the regions included in the diffusion region 801 are the P-region 8011, the P region 8012, and the compound region 8013.

Similarly to the diffusion region 304 functioning as the source region of the write transistor 203, the diffusion region 803 functioning as the source region of the reset transistor 702 includes the compound region 3013, a P region 8032, and a P-region 8031. The diffusion region 803 is configured such that the P-region 8031 (twenty-fourth region), the P region 8032 (twenty-second region), and the compound region 3013 (twenty-first region) are arranged in this order from the channel region 8021 side of the reset transistor 702 along the direction of current flow. In descending order of resistivity, the regions included in the diffusion region 803 are the P-region 8031, the P region 8032, and the compound region 3013.

The P regions 8012 and 8032 and the P-regions 8011 and 8031 are made of semiconductors of the same conductivity type as the diffusion regions of the reset transistor 702 that is a P-type transistor. The P regions 8012 and 8032 and the P-regions 8011 and 8031 are made of semiconductors of the opposite conductivity type to that of the channel region 8021. In the present exemplary embodiment, the P regions 8012 and 8032 and the P-regions 8011 and 8031 are semiconductor regions doped with P-type impurities. The diffusion regions 801 and 803 have an LDD structure where the P-regions 8011 and 8031 on the channel region 8021 side have an impurity concentration lower than that of the P regions 8012 and 8032. This makes the resistivity of the P-regions 8011 and 8031 higher than that of the P regions 8012 and 8032 as described above. The compound regions 3013 and 8013 may have an impurity concentration similar to that of the P regions 8012 and 8032.

The compound regions 8013 and 3013 are made of a semiconductor-metal compound. In the present exemplary embodiment, the P regions 8012 and 8032 and the P-regions 8011 and 8031 are regions formed of silicon. The compound regions 8013 and 3013 are silicide regions formed by making part of the P regions 8032 and 8012 react with metal. In other words, the compound region 8013 is made of a compound of the semiconductor that is the main component of the P region 8032 with the metal. The compound region 3013 is made of a compound of the semiconductor that is the main component of the P region 8012 with the metal. The compound regions 8013 and 3013 thus have a lower resistivity than those of the P regions 8012 and 8032 and the P-regions 8011 and 8031. The reset transistor 702 is connected with contact plugs at the compound regions 8013 and 3013 thus reduced in resistance, and connected to external elements.

Lengths of Regions in Transistors

The lengths of the regions included in the diffusion regions of the transistors in a plan view perpendicular to the substrate 401 will now be described with reference to FIGS. 8 and 9.

In the plan view of the emission control transistor 701 perpendicular to the substrate 401, the length of the current path from the end of the gate electrode 805 to the end of the compound region 8063 will be denoted by D31. In the plan view perpendicular to the substrate 401, the length of the current path from the end of the gate electrode 805 to the end of the compound region 3033 will be denoted by D32. In other words, the length of the current path from the source region-side component region of the emission control transistor 701 to the gate electrode 805 in the plan view is D31, and the length of the current path from the drain region-side compound region of the emission control transistor 701 to the gate electrode 805 is D32. If there is a plurality of current paths of different lengths between a compound region and the gate electrode, the length of the shortest current path may be employed. If, as illustrated in FIG. 8, the portions located between the compound regions of the source and drain regions and the gate electrode are straight, the foregoing lengths may refer to the distances between the ends. In the plan view of the emission control transistor 701 perpendicular to the substrate 401, the length of the current path in the P-region 8041 will be denoted by d32. In the present exemplary embodiment, the diffusion region 806 functioning as the source region of the emission control transistor 701 includes no P-region. However, if the diffusion region 806 includes a P-region, the length of the current path of the P-region in the plan view perpendicular to the substrate 401 may be denoted by d31. The present exemplary embodiment can be regarded as where d31 is 0. In other words, the length of the current path in the source region-side LDD region of the emission control transistor 701 is d31. The length of the current path in the drain region-side LDD region of the emission control transistor 701 is d32.

In the plan view of the reset transistor 702 perpendicular to the substrate 401, the length of the current path from the end of the gate electrode 802 to the end of the compound region 3013 will be denoted by D41. In the plan view perpendicular to the substrate 401, the length of the current path from the end of the gate electrode 802 to the end of the compound region 8013 will be denoted by D42. In other words, the length of the current path from the source region-side compound region of the reset transistor 702 to the gate electrode 802 in the plan view is D41, and the length of the current path from the drain region-side compound region of the reset transistor 702 to the gate electrode 802 is D42. If there is a plurality of current paths of different lengths between a compound region and the gate electrode, the length of the shortest current path may be employed. If, as illustrated in FIG. 8, the portions located between the compound regions of the source and drain regions and the gate electrode are straight, the foregoing lengths may refer to the distances between the ends. In the plan view of the reset transistor 702 perpendicular to the substrate 401, the length of the current path in the P-region 8031 will be denoted by d41, and the length of the current path in the P-region 8011 by d42. In other words, the length of the source region-side LDD region of the reset transistor 702 along the direction of current flow is d41, and the length of the drain region-side LDD region of the reset transistor 702 along the direction of current flow is d42.

Even in the present exemplary embodiment, the write transistor 203 is configured such that the length D22 of the current path from the end of the gate electrode 305 to the end of the compound region 3063 is greater than the length D21 of the current path from the end of the gate electrode 305 to the end of the compound region 3043. That is, D22>D21 holds. Such an electric field-reducing configuration can reduce the occurrence of an off leakage current in the drain region of the write transistor 203.

The potential of the gate electrode 302 of the driving transistor 201 can thus be stabilized to stabilize the emission luminance of the light emitting element 200. As a result, the emission or display quality of the light emitting apparatus 601 can be improved.

In one embodiment, the length D22 is greater than the length d22 of the P-region 3061 of the write transistor 203. That is, it is that D22>d22 hold. Moreover, the length D22 is greater than any of the lengths D11, D12, D21, D31, D32, D41, and D42. In other words, the length D22 of the current path in the write transistor 203 is the greatest of the lengths of the current paths from the ends of the gate electrodes to the ends of the compound regions included in the transistors constituting the pixel 602. Moreover, the length d22 is greater than any of the lengths d11, d12, d21, d31, d32, d41, and d42. In other words, the length of the drain region-side LDD region of the write transistor 203 is the greatest of the lengths of the LDD regions included in the transistors constituting the pixel 602. Such a configuration can further reduce the foregoing electric fields in the drain region of the write transistor 203. This can further reduce the occurrence of an off leakage current in the drain region of the write transistor 203 and further stabilize the emission luminance of the light emitting element 200. As a result, the emission or display quality of the light emitting apparatus 601 can be further improved.

Figure 10:
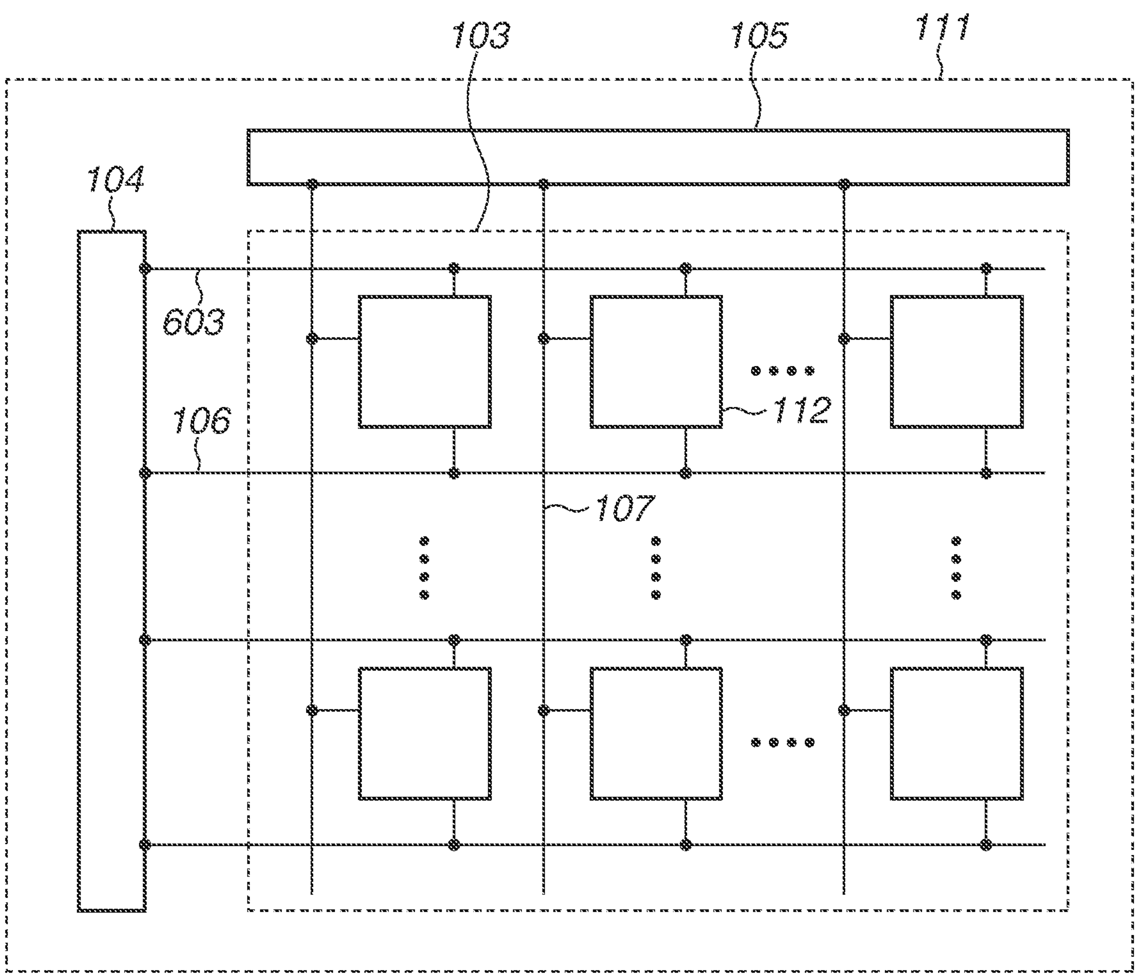
FIG. 10 is a diagram illustrating a configuration example of a light emitting apparatus according to a third exemplary embodiment.
Figure 11:
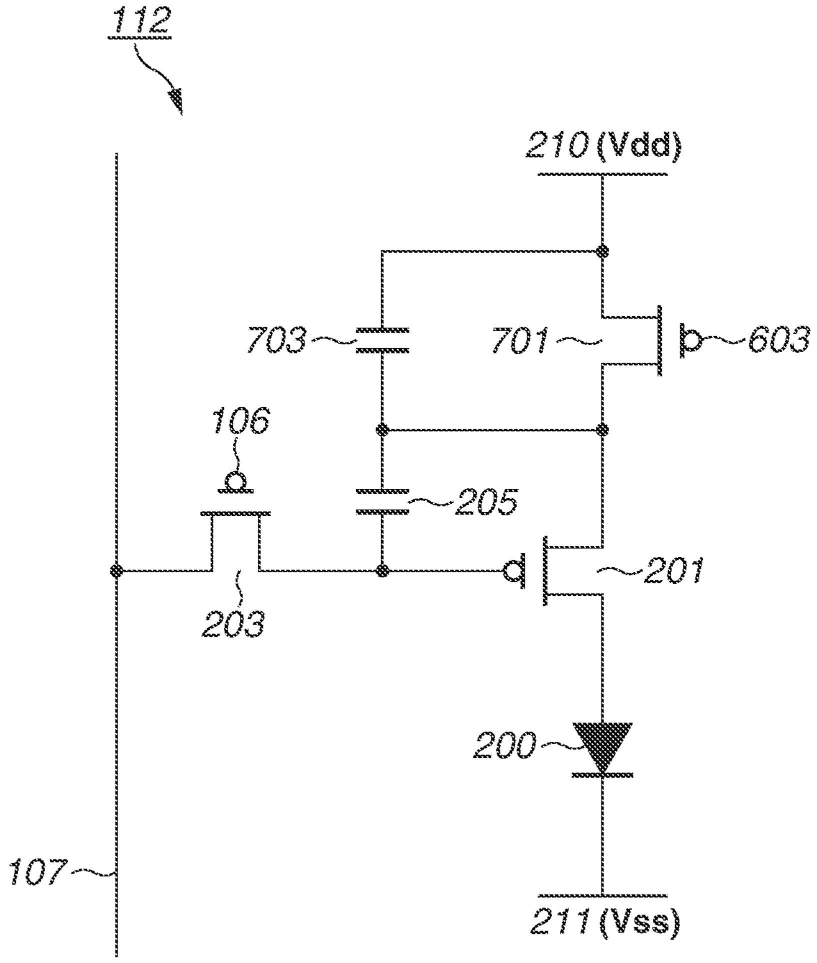
FIG. 11 is a circuit diagram illustrating a configuration example of a pixel in the light emitting apparatus of FIG. 10.

A light emitting apparatus according to a third exemplary embodiment of the disclosure will be described with reference to FIGS. 10 to 13. FIG. 10 is a diagram illustrating a configuration example of a light emitting apparatus 111 according to the third exemplary embodiment of the disclosure. FIG. 11 is a circuit diagram of a pixel 112 included in the light emitting apparatus 111. The present exemplary embodiment differs from the second exemplary embodiment mainly in that each pixel 112 of the light emitting apparatus 111 does not include the reset transistor 702 (fourth transistor). In other words, a pixel according to the present exemplary embodiment includes three transistors while a pixel according to the second exemplary embodiment includes four transistors. Differences in the configuration of the light emitting apparatus 111 according to the present exemplary embodiment from that of the foregoing light emitting apparatus 601 will be mainly described below.

As illustrated in FIG. 10, an organic EL display apparatus that is an example of the light emitting apparatus 111 includes a pixel array section 103 and a driving section disposed around the pixel array section 103. The light emitting apparatus 111 does not include the third scan lines 604 disposed in the second exemplary embodiment. In other words, the light emitting apparatus 111 further includes second scan lines 603 in addition to the configuration of the first exemplary embodiment.

A circuit configuration of the pixels 112 according to the present exemplary embodiment will now be described with reference to FIG. 11. As illustrated in FIG. 11, each of the plurality of pixels 112 arranged in the pixel array section 103 includes an emission control transistor 701 (third transistor) disposed on a current path including a light emitting element 200 and a driving transistor 201 (first transistor). The pixel 112 also includes two capacitive element 205 and 703. The three transistors (first to third transistors) included in the pixel 112 are a MOSFET each.

Figure 12:
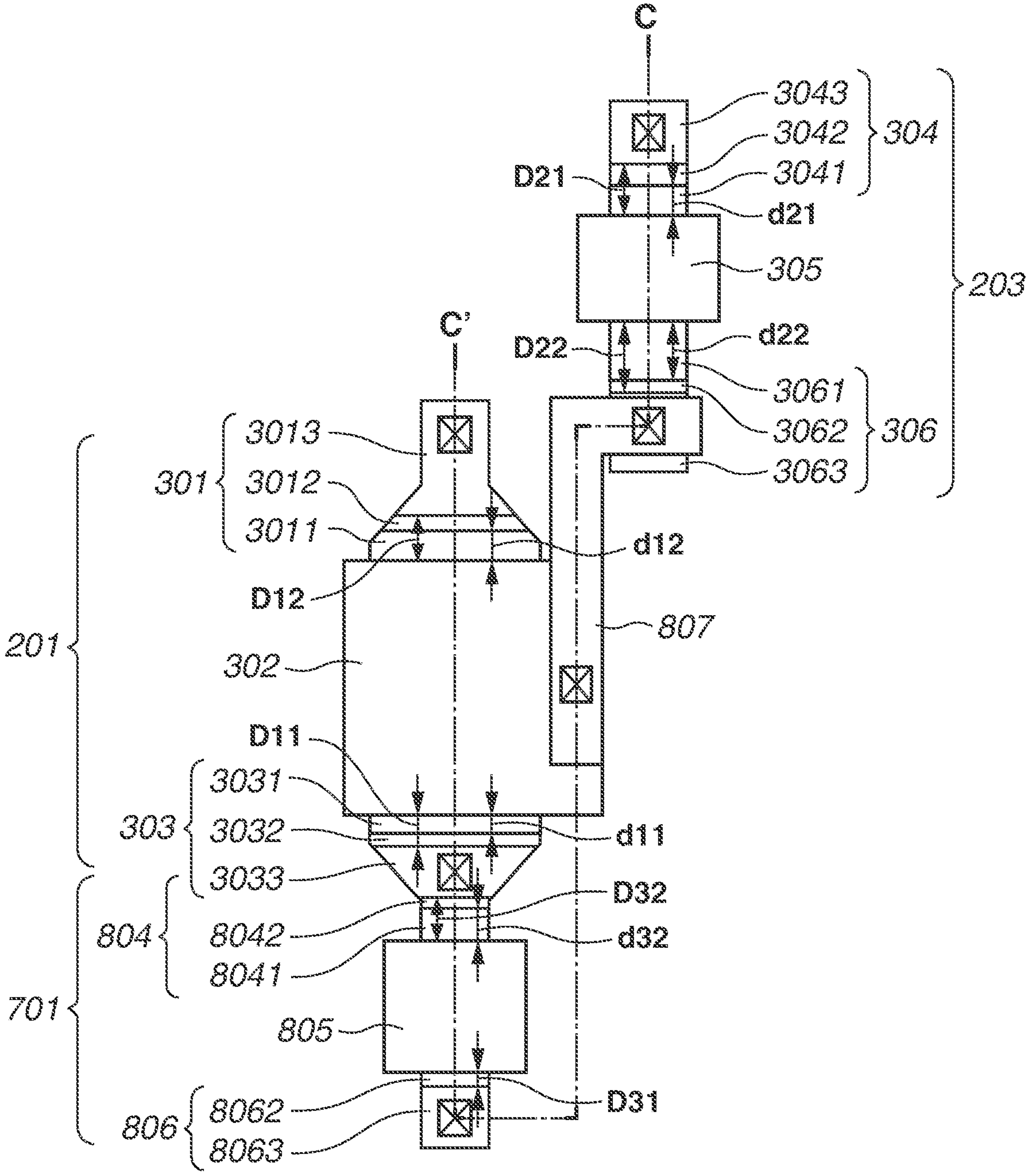
FIG. 12 is a plan view illustrating the configuration example of the pixel in the light emitting apparatus of FIG. 10.
Figure 13:
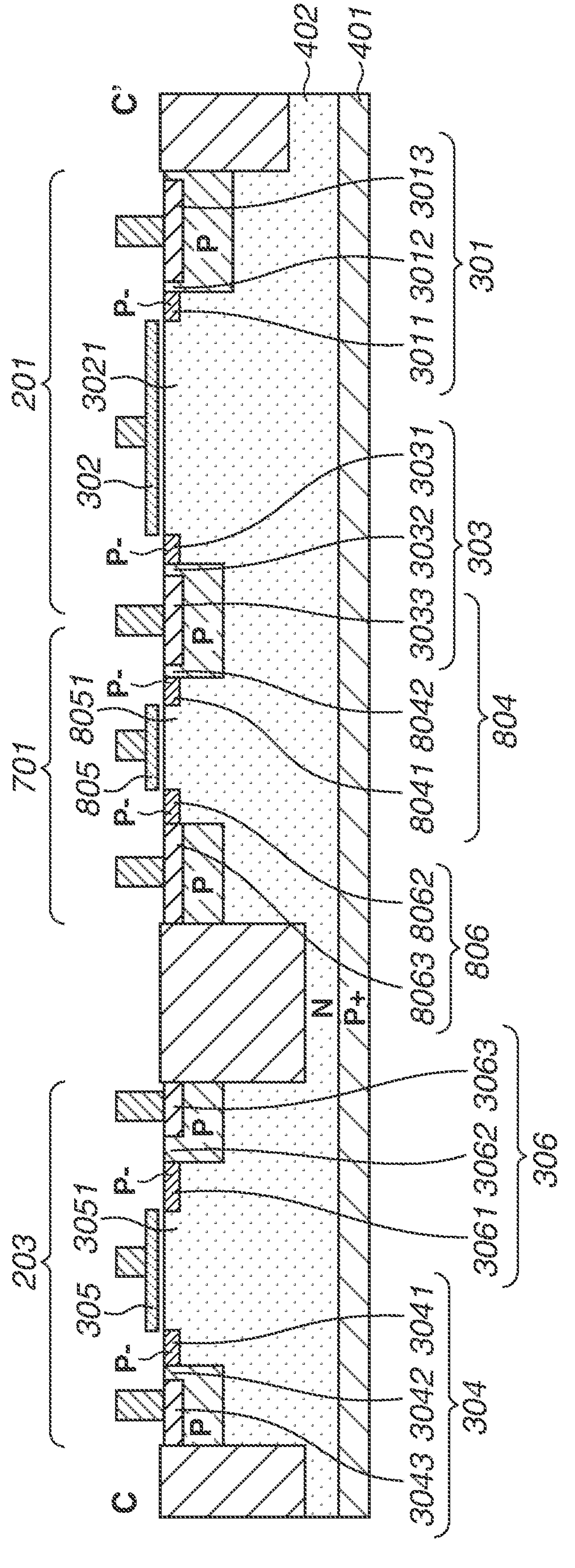
FIG. 13 is a sectional view illustrating the configuration example of the pixel in the light emitting apparatus of FIG. 10.

Details of the transistors included in the pixel 112 will now be described with reference to FIGS. 12 and 13. FIG. 12 is a plan view of the pixel 112. FIG. 13 is a sectional view taken along the line C-C' illustrated in FIG. 12. The configuration illustrated in FIGS. 12 and 13 is the same as that of the pixel 602 according to the second exemplary embodiment except for the reset transistor 702.

Even in the exemplary embodiment, the length D22 of the current path from the end of the gate electrode 305 to the end of the compound region 3063 is greater than the length D21 of the current path from the end of the gate electrode 305 to the end of the compound region 3043. That is, D22>D21 holds. The foregoing electric fields in the drain region of the write transistor 203 can be further reduced by such a configuration. This can further reduce the occurrence of an off leakage current in the drain region of the write transistor 203 and further stabilize the emission luminance of the light emitting element 200. As a result, the emission or display quality of the light emitting apparatus 111 can further be improved.

In one embodiment, the length D22 is greater than the length d22 of the P-region 3061 of the write transistor 203. In other words, it is that D22>d22 hold. Moreover, the length D22 is greater than any of the lengths D11, D12, D21, D31, and D32. In other words, the length D22 of the current path in the write transistor 203 is the greatest of the lengths of the current paths from the ends of the gate electrodes to the ends of the compound regions included in the transistors constituting the pixel 112. Moreover, the length d22 is greater than any of the lengths d11, d12, d21, d31 and d32. In other words, the length of the drain region-side LDD region of the write transistor 203 is the greatest of the lengths of the LDD regions of the transistors constituting the pixel 112. The foregoing electric fields in the drain region of the write transistor 203 can be further reduced by such a configuration. This can further reduce the occurrence of an off leakage current in the drain region of the write transistor 203 and further stabilize the emission luminance of the light emitting element 200. As a result, the emission or display quality of the light emitting apparatus 111 can further be improved.

Figure 14:
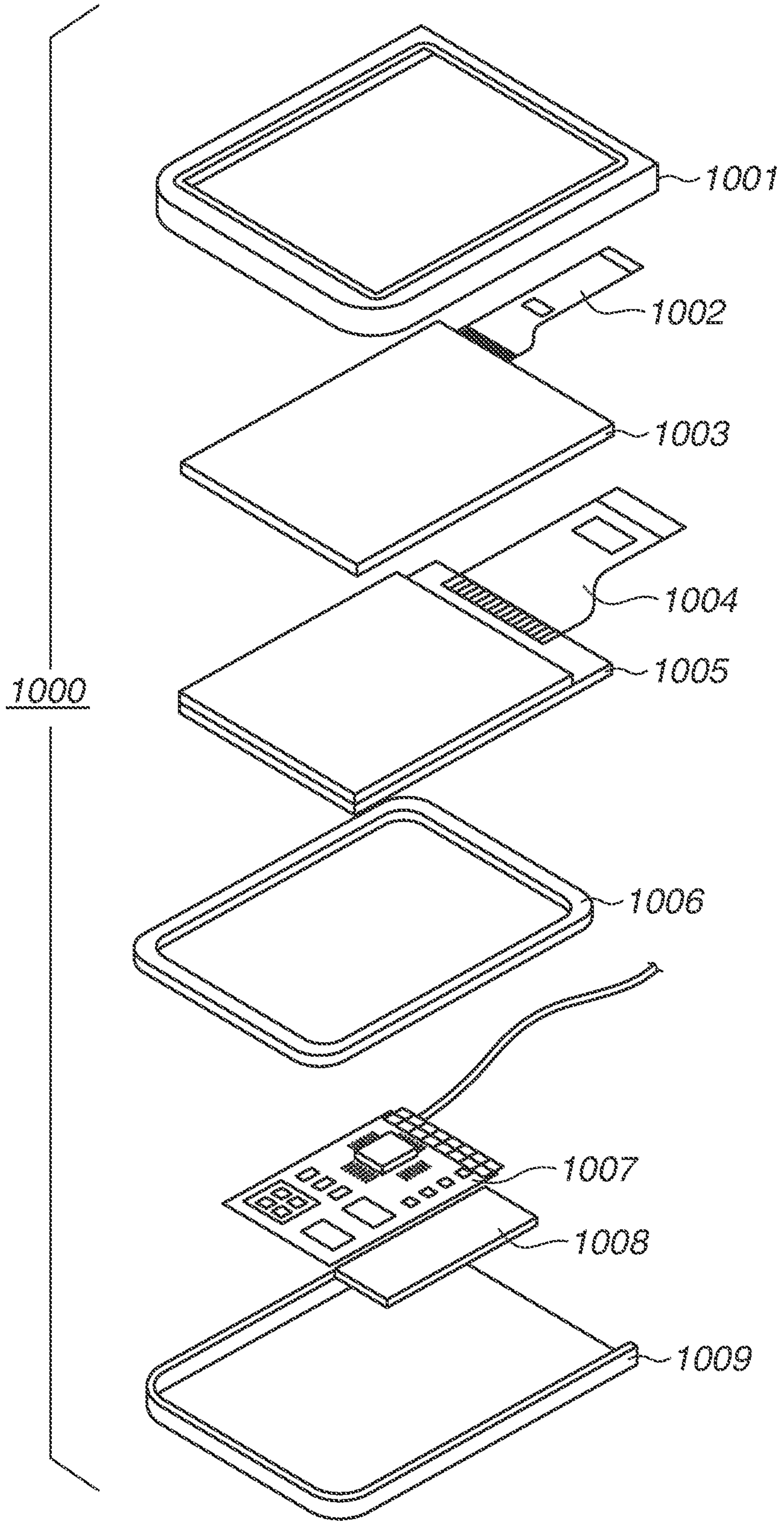
FIG. 14 is a schematic diagram illustrating an example of a display apparatus.

FIG. 14 is a schematic diagram illustrating an example of a display apparatus according to another exemplary embodiment. A display apparatus 1000 may include a touch panel 1003, a display panel 1005, a frame 1006, a circuit substrate 1007, and a battery 1008 between an upper cover 1001 and a lower cover 1009. The display panel 1005 may include any of the foregoing light emitting apparatuses 101, 601, and 111. Flexible printed circuits (FPCs) 1002 and 1004 are connected to the touch panel 1003 and the display panel 1005. The circuit substrate 1007 includes printed transistors. The battery 1008 may be omitted if the display apparatus 1000 is not a portable device. The battery 1008 may be located at a different position even if the display apparatus 1000 is a portable device.

The display apparatus 1000 according to the present exemplary embodiment may include red, green, and blue color filters. The red, green, and blue color filters may be arranged in a delta arrangement.

The display apparatus 1000 according to the present exemplary embodiment may be used for a display unit of a mobile terminal. In such a case, the display apparatus 1000 may have both a display function and an operation function. Examples of the mobile terminal include a mobile phone such as a smartphone, a tablet, and a head-mounted display.

The display apparatus 1000 according to the present exemplary embodiment may be used as a display unit of an imaging apparatus that includes an optical unit including a plurality of lenses and an image sensor for receiving light passed through the optical unit. The imaging apparatus may include a display unit that displays information obtained by the image sensor. The display unit may be one exposed to outside the imaging apparatus or one located in a viewfinder. The imaging apparatus may be a digital camera or a digital video camera.

Figure 15A:
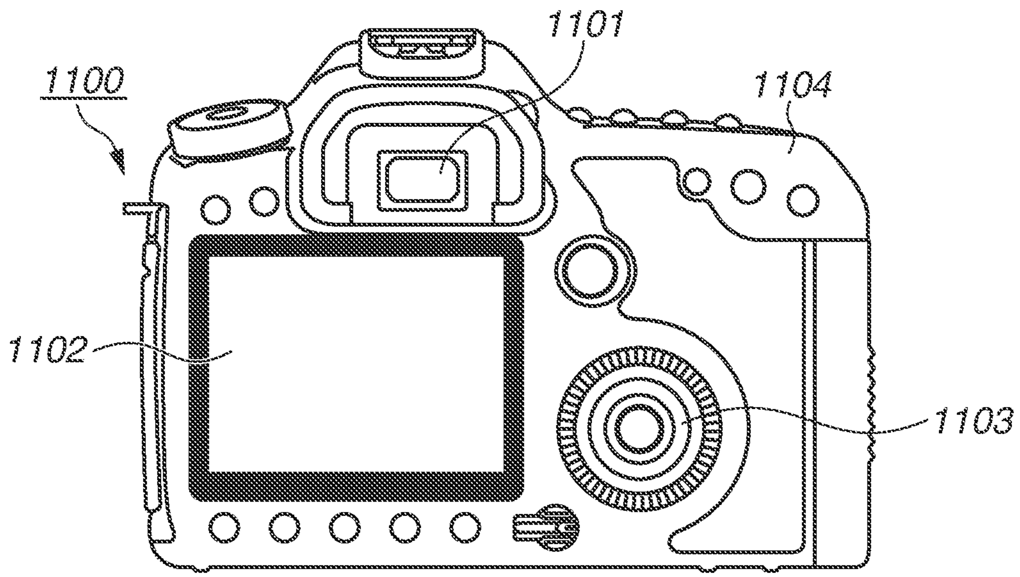
FIG. 15A is a schematic diagram illustrating an example of an imaging apparatus.

FIG. 15A is a schematic diagram illustrating an example of the imaging apparatus according to the present exemplary embodiment. An imaging apparatus 1100 may include a viewfinder 1101, a rear display 1102, an operation unit 1103, and a housing 1104. The viewfinder 1101 may include any of the foregoing light emitting apparatuses 101, 601, and 111. Alternatively, the viewfinder 1101 may include the foregoing display apparatus 1000. The display apparatus 1000 may display not only an image to be captured but also environmental information and imaging instructions. The environmental information may include the intensity of external light, the direction of the external light, the moving speed of an object, and the possibility of an object being occluded by an obstacle.

In one embodiment, such information is displayed as quickly as possible because timing suitable for imaging is short. Thus, a display apparatus using organic light emitting elements as the light emitting elements 200 is used. The reason is that organic light emitting elements are highly responsive. Display apparatuses using organic light emitting elements can be more suitably used for such apparatuses demanding high display speed than for liquid crystal display apparatuses.

The imaging apparatus 1100 includes a not-illustrated optical unit. The optical unit includes a plurality of lenses and forms an image on an image sensor accommodated in the housing 1104. Focus can be adjusted by adjusting relative positions of the plurality of lenses. Such an operation can also be performed automatically. The imaging apparatus 1100 may be referred to as a photoelectric conversion apparatus. The photoelectric conversion apparatus may use an imaging method such as a method for detecting differences from previous images and a method for cutting out images from a constantly recorded image, instead of successively capturing images.

Figure 15B:
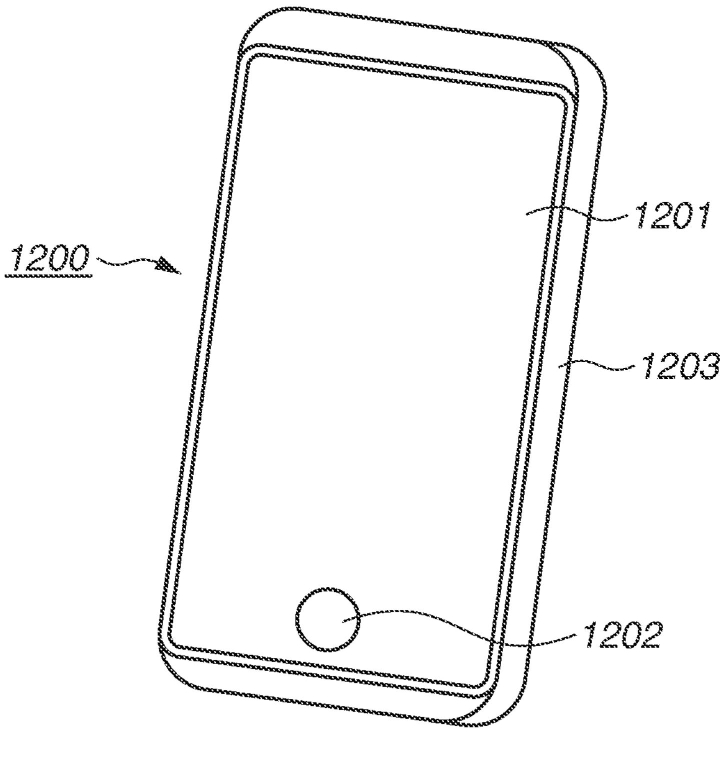
FIG. 15B is a schematic diagram illustrating an example of an electronic device.

FIG. 15B is a schematic diagram illustrating an example of an electronic device according to the present exemplary embodiment. An electronic device 1200 includes a display unit 1201, an operation unit 1202, and a housing 1203. The display unit 1201 may include any of the foregoing light emitting apparatuses 101, 601, and 111. Alternatively, the display unit 1201 may include the foregoing display apparatus 1000. The housing 1203 may include a circuit, a printed circuit board including the circuit, a battery, and a communication unit. The operation unit 1202 may be a button or a touch-panel sensor. The operation unit 1202 may be a biometric recognition unit that recognizes fingerprints for unlocking. The electronic device 1200 including a communication unit may be referred to as a communication device. The electronic device 1200 may further include a lens and an image sensor and have a camera function. An image captured by the camera function is displayed on the display unit 1201. Examples of the electronic device 1200 include a smartphone, a tablet terminal, and a laptop personal computer (PC).

Figure 16A:
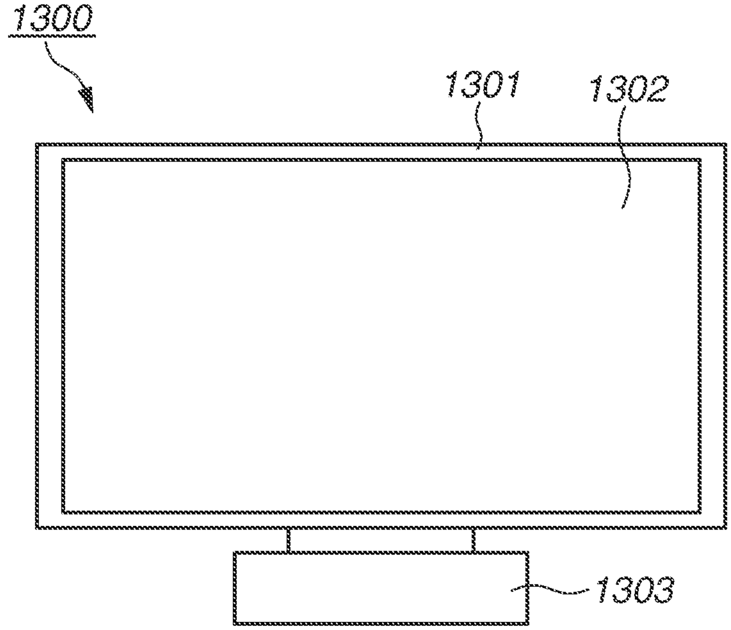
FIGS. 16A and 16B are schematic diagrams illustrating examples of a display apparatus.

FIG. 16A is a schematic diagram illustrating an example of a display apparatus according to the present exemplary embodiment. FIG. 16A illustrates a display apparatus such as a television monitor and a PC monitor. A display apparatus 1300 includes a frame 1301 and a display unit 1302. The display unit 1302 may include any of the foregoing light emitting apparatuses 101, 601, and 111, or the foregoing display apparatus 1000.

The display apparatus 1300 includes a base 1303 supporting the frame 1301 and the display unit 1302. The base 1303 is not limited to the configuration of FIG. 16A. The lower side of the frame 1301 may serve as a base.

The frame 1301 and the display unit 1302 may be curved. The radius of curvature may be 5000 mm or more and not more than 6000 mm.

Figure 16B:
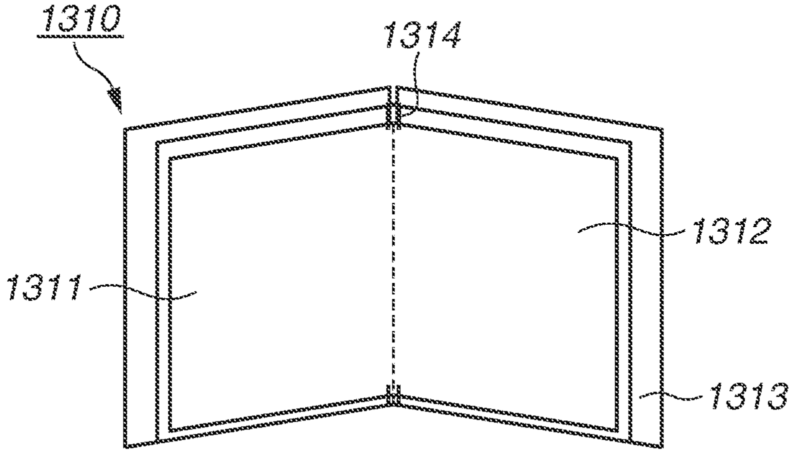

FIG. 16B is a schematic diagram illustrating another example of the display apparatus according to the present exemplary embodiment. A display apparatus 1310 illustrated in FIG. 16B is configured to be foldable, i.e., is a foldable display apparatus. The display apparatus 1310 includes a first display unit 1311, a second display unit 1312, a housing 1313, and folding points 1314. The first and second display units 1311 and 1312 may include any of the foregoing light emitting apparatuses 101, 601, and 111, or the foregoing display apparatus 1000. The first and second display units 1311 and 1312 may be a single seamless display apparatus. The first and second display units 1311 and 1312 can be divided by the folding points 1314. The first and second display units 1311 and 1312 may display respective different images. A single image may be displayed by the first and second display units 1311 and 1312.

Figure 17A:
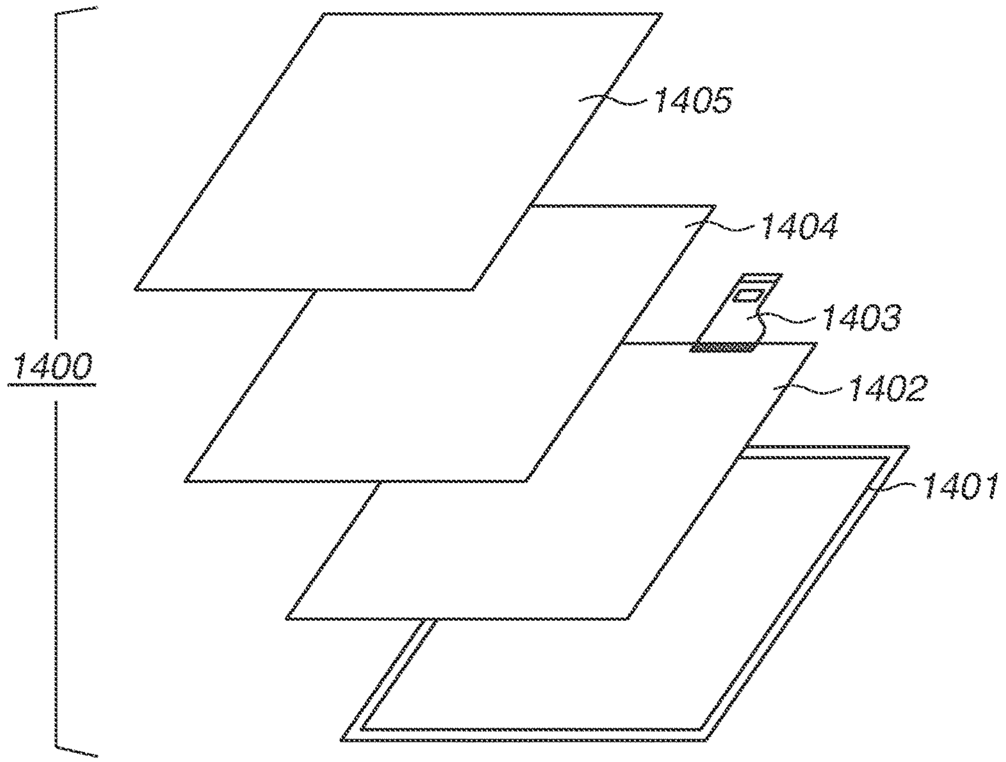
FIGS. 17A and 17B are schematic diagrams illustrating examples of an illumination apparatus.

FIG. 17A is a schematic diagram illustrating an example of an illumination apparatus according to the present exemplary embodiment. An illumination apparatus 1400 may include a housing 1401, a light source 1402, a circuit substrate 1403, an optical film 1404, and a light diffusion unit 1405. The light source 1402 may include any of the foregoing light emitting apparatuses 101, 601, and 111. The optical film 1404 may be a filter for improving the color rendering property of the light source 1402. The light diffusion unit 1405 can effectively diffuse the light from the light source 1402 and deliver the light to a wide range. An example of the light diffusion unit 1405 is a light diffusion film LIGHT-UP manufactured by KIMOTO Co., Ltd. The optical film 1404 and the light diffusion unit 1405 may be located on the light emission side of the illumination apparatus 1400.

A cover may be disposed on the outermost periphery as appropriate.

The illumination apparatus 1400 is an apparatus for illuminating a room, for example. The illumination apparatus 1400 may emit light in any color such as white, neutral white, and blue to red. The illumination apparatus 1400 may include a light control circuit for controlling light of such colors.

The illumination apparatus 1400 may include an organic light emitting element according to the present exemplary embodiment and a power supply circuit connected thereto. The power supply circuit is a circuit for converting an alternating-current voltage into a direct-current voltage. White refers to a color temperature of 4200 K, and neutral white refers to a color temperature of 5000 K. The illumination apparatus 1400 may include a color filter.

The illumination apparatus 1400 according to the present exemplary embodiment may include a heat dissipation member. The heat dissipation member dissipates heat inside the illumination apparatus 1400 to outside the illumination apparatus 1400. Examples of the heat dissipation member include a piece of high specific heat metal and liquid silicon.

Figure 17B:
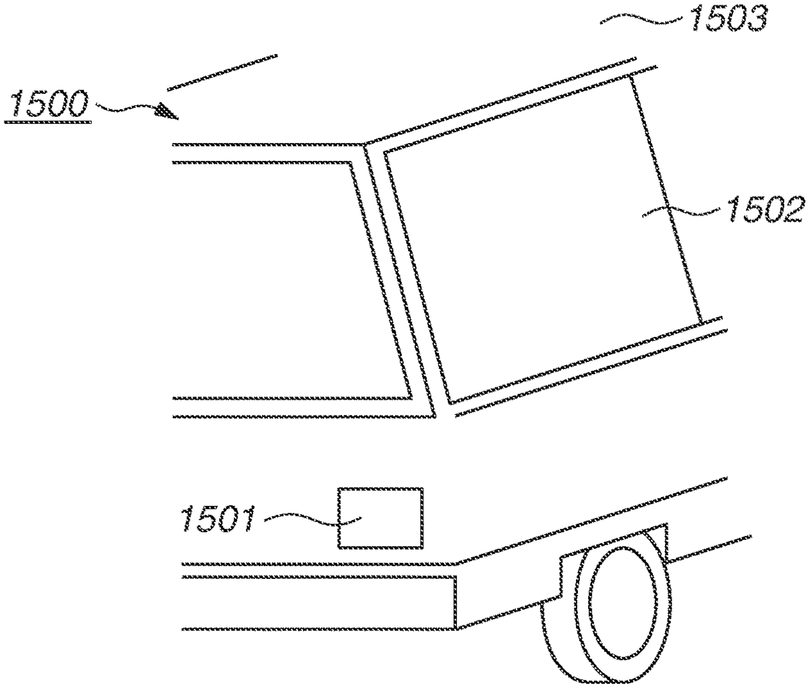

FIG. 17B is a schematic diagram illustrating an automobile that is an example of a moving body according to the present exemplary embodiment. The automobile includes taillights that are an example of a lighting unit. An automobile 1500 may include a taillight 1501 and be configured to turn on the taillight 1501 when a braking operation is made.

The taillight 1501 may include an organic light emitting element according to the present exemplary embodiment. The taillight 1501 may include a protection member for protecting the organic EL element (organic light emitting element). The protection member may be made of any material as long as the material has somewhat high strength and transparency. In one embodiment, the protection member is made of polycarbonate. The polycarbonate may be mixed with furandicarboxylic acid derivatives or acrylonitrile derivatives.

The automobile 1500 may include a car body 1503 and a windrow 1502 attached thereto. The window 1502 may be a transparent display if not intended to observe in front of or behind the automobile 1500. The transparent display may include an organic light emitting element according to the present exemplary embodiment. In such a case, the electrodes of the organic light emitting element are made of transparent members.

The moving body according to the present exemplary embodiment may be a ship, an aircraft, or a drone. The moving body may include a body and a lighting unit attached to the body. The lighting unit may emit light to indicate the position of the body. The lighting unit includes an organic light emitting element according to the present exemplary embodiment.

Application examples of the display apparatuses according to the foregoing exemplary embodiments will be described with reference to FIGS. 18A and 18B. The display apparatuses are applicable to a system that can be worn as a wearable device, such as smart glasses, a head-mounted display (HMD), and smart contact lenses. An imaging and display apparatus used in such application examples includes an imaging apparatus capable of photoelectrically converting visible light and a display apparatus capable of emitting visible light.

Figure 18A:
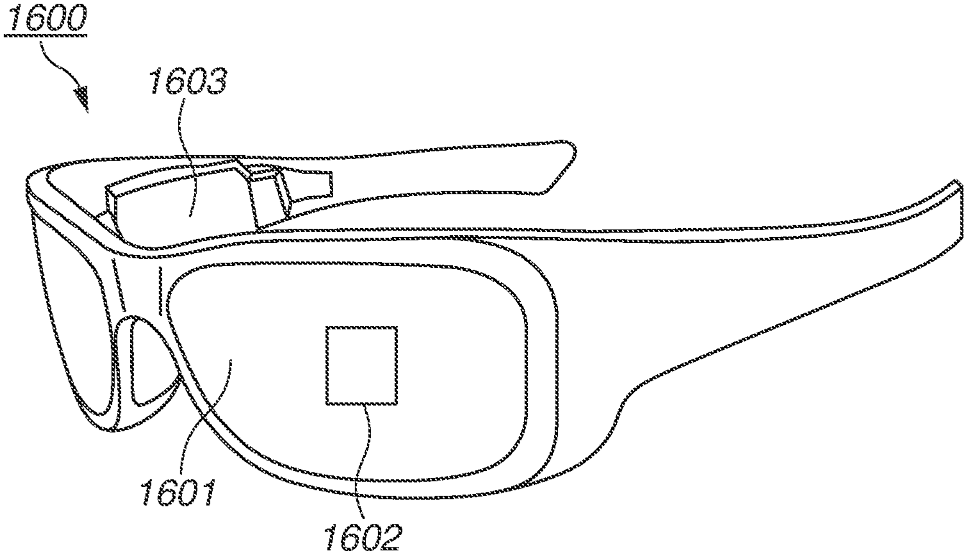
FIGS. 18A and 18B are schematic diagrams illustrating application examples of the display apparatus.

FIG. 18A illustrates glasses 1600 (smart glasses) according to an application example. An imaging apparatus 1602, such as a complementary MOS (CMOS) image sensor and a single photon avalanche diode (SPAD) image sensor, is disposed on the surface side of a lens 1601 of the glasses 1600. A display apparatus according to any one of the foregoing exemplary embodiments is disposed on the back side of the lens 1601.

The glasses 1600 further include a control apparatus 1603. The control apparatus 1603 functions as a power supply for supplying power to the imaging apparatus 1602 and the display apparatus. The control apparatus 1603 also controls operation of the imaging apparatus 1602 and the display apparatus. The lens 1601 is equipped with an optical system for collecting light to the imaging apparatus 1602.

Figure 18B:
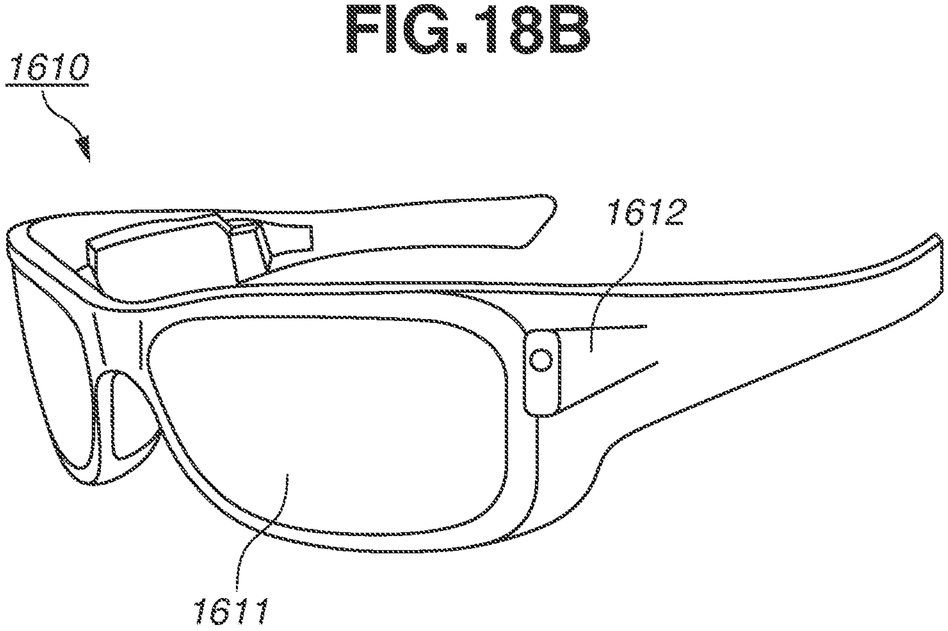

FIG. 18B illustrates glasses 1610 (smart glasses) according to another application example. The glasses 1610 include a control apparatus 1612. The control apparatus 1612 includes an imaging apparatus corresponding to the imaging apparatus 1602 and a display apparatus. A lens 1611 is equipped with the imaging apparatus included in the control apparatus 1612 and an optical system for projecting light emitted from the display apparatus, and an image is projected on the lens 1611. The control apparatus 1612 functions as a power supply for supplying power to the imaging apparatus and the display apparatus, and controls operation of the imaging apparatus and the display apparatus. The control apparatus may include a line of sight detection unit that detects the line of sight of the wearer. The line of sight may be detected by using infrared rays. An infrared emission unit emits infrared rays to an eyeball of the user (wearer) gazing at a display image. An imaging unit including a light receiving element that detects reflection of the emitted infrared rays from the eyeball, whereby a captured image of the eyeball is obtained. The glasses 1610 include a reduction unit for reducing infrared rays from the infrared emission unit to the display unit in a plan view, whereby a drop in image quality is reduced.

The user's line of sight to the display image is detected from the captured image of the eyeball obtained by the infrared imaging. Any conventional technique can be applied to the detection of the line of sight using the captured image of the eyeball. For example, a line of sight detection method based on Purkinje images of the illumination light reflected from the cornea can be used.

More specifically, the line of sight detection unit performs line of sight detection processing based on a pupil and corneal reflection method. With the pupil and corneal reflection method, the user's line of sight is detected by calculating a line of sight vector indicating the direction (rotation angle) of the eyeball, based on a pupil image and Purkinje images included in the captured image of the eyeball.

A display apparatus according to an exemplary embodiment of the disclosure may include an imaging apparatus including a light receiving element, and control a display image on the display apparatus based on a user's line of sight information provided by the imaging apparatus.

Specifically, the display apparatus determines a first field of view region gazed at by the user and a second field of view region other than the first field of view region, based on the line of sight information. The first field of view region and the second field of view region may be determined by a control apparatus of the display apparatus. The display apparatus may receive a first field of view region and a second field of view region determined by an external control apparatus. In the display region of the display apparatus, the first field of view region may be controlled to have a higher display resolution than that of the second field of view region. In other words, the display resolution of the second field of view region may be made lower than that of the first field of view region.

Alternatively, the display region includes a first display region and a second display region different from the first display region, and a region of higher priority between the first and second display regions is determined based on the line of sight information. The first and second display regions may be determined by the control apparatus of the display apparatus. The display apparatus may receive first and second display regions determined by an external control apparatus. The region of higher priority may be controlled to have a higher resolution than that of the region other than the region of higher priority. In other words, the resolution of the region of relatively low priority may be made lower.

The first field of view region or the region of higher priority may be determined by using artificial intelligence (AI). The AI may be a model configured to estimate the angle of the line of sight or a distance to an object in the line of sight from eyeball images, based on teaching data of eyeball images and actual directions of view of eyeballs having the eyeball images. An AI program may be retained in the display apparatus, the imaging apparatus, or an external apparatus. If the AI program is retained in the external apparatus, the AI program is transmitted to the display apparatus through communication.

In controlling display based on the line of sight detection, appropriate application can be made to smart glasses further including an imaging apparatus that captures an outside image. The smart glasses can display captured external information in real time.

As described above, the use of the light emitting apparatus according to the present exemplary embodiment enables display with favorable image quality.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-196853, filed Nov. 27, 2020, which is hereby incorporated by reference herein in its entirety.

What is claimed is:

1. An apparatus comprising a plurality of pixels arranged in an array on a substrate, the plurality of pixels each including a light emitting element, a first transistor, and a second transistor, one of main terminals of the first transistor being connected to an anode of the light emitting element, and one of main terminals of the second transistor being connected to a control terminal of the first transistor, wherein the one of main terminals of the second transistor that is connected to the control terminal of the first transistor includes a first region, a second region located between the first region and a channel region of the second transistor and a fifth region located between the second region and the channel region of the second transistor, wherein another of main terminals of the second transistor includes a third region and a fourth region located between the third region and the channel region of the second transistor, wherein the first and third regions are made of a semiconductor-metal compound, wherein the second and fourth regions are made of a semiconductor, wherein in a plan view perpendicular to the substrate, a length of a current path from the first region to a control terminal of the second transistor is greater than a length of a current path from the third region to the control terminal of the second transistor, and wherein a resistivity of the fifth region is higher than a resistivity of the second region.

2. The apparatus according to claim 1, wherein the one of main terminals of the second transistor that is connected to the control terminal of the first transistor further includes a fifth region located between the second region and the channel region of the second transistor, and wherein the first, second, and fifth regions are semiconductor regions of a same conductivity type.

3. The apparatus according to claim 1, wherein the first and third regions are silicide regions.

4. The apparatus according to claim 1, wherein the one of main terminals of the second transistor that is not connected to the control terminal of the first transistor further includes a sixth region located between the fourth region and the channel region of the second transistor, wherein the third, fourth, and sixth regions are semiconductor regions of a same conductivity type, and wherein the sixth region has an impurity concentration lower than those of the third and fourth regions.

5. The apparatus according to claim 4, wherein a resistivity of the first region is lower than a resistivity of the second region, wherein a resistivity of the third region is lower than a resistivity of the fourth region, and wherein the resistivity of the fourth region is lower than a resistivity of the sixth region.

6. The apparatus according to claim 1, wherein the one of main terminals of the first transistor includes a sixth region and a seventh region located between the sixth region and a channel region of the first transistor, wherein the other of main terminals of the first transistor includes an eighth region and a ninth region located between the eighth region and the channel region of the first transistor, wherein the sixth and eighth regions are made of a semiconductor-metal compound, wherein the seventh and ninth regions are made of a semiconductor, and wherein in the plan view perpendicular to the substrate, the length of the current path from the first region to the control terminal of the second transistor is greater than a length of a current path from the sixth region to the control terminal of the first transistor and a length of a current path from the eighth region to the control terminal of the first transistor.

7. The apparatus according to claim 6, wherein in the plan view perpendicular to the substrate, a length of a current path from the second region to the control terminal of the second transistor is greater than a length of a current path from the fourth region to the control terminal of the second transistor, a length of a current path from the seventh region to the control terminal of the first transistor, and a length of a current path from the ninth region to the control terminal of the first transistor.

8. The apparatus according to claim 6, wherein in the plan view perpendicular to the substrate, the length of the current path from the fifth region to the control terminal of the first transistor is greater than the length of the current path from the seventh region to the control terminal of the first transistor.

9. The apparatus according to claim 1, wherein in the plan view perpendicular to the substrate, the length of the current path from the first region to the control terminal of the second transistor is greater than a length of a current path from the second region to the control terminal of the second transistor.

10. An apparatus comprising a plurality of pixels arranged in an array on a substrate, the plurality of pixels each including a light emitting element, a first transistor, and a second transistor, one of main terminals of the first transistor being connected to an anode of the light emitting element, one of main terminals of the second transistor being connected to a control terminal of the first transistor, wherein the one of main terminals of the second transistor that is connected to the control terminal of the first transistor includes a first region, a second region located between the first region and a channel region of the second transistor, and a fifth region located between the second region and the channel region of the second transistor, wherein the other of main terminals of the second transistor includes a third region and a fourth region located between the third region and the channel region of the second transistor, wherein a resistivity of the first region is lower than a resistivity of the second region, wherein the resistivity of the second region is lower than a resistivity of the fifth region, wherein a resistivity of the third region is lower than a resistivity of the fourth region, and wherein in a plan view perpendicular to the substrate, a length of a current path from the first region to a control terminal of the second transistor is greater than a length of a current path from the third region to the control terminal of the second transistor.

11. The apparatus according to claim 1, wherein the plurality of pixels each includes a first capacitive element located between the control terminal of the first transistor and the other of main terminals of the first transistor.

12. The apparatus according to claim 1, wherein the plurality of pixels each further includes a third transistor configured to control emission or non-emission of the light emitting element, a one of main terminals of the third transistor being connected to the other of main terminals of the first transistor.

13. The apparatus according to claim 12, wherein the one of main terminals of the third transistor includes a sixth region and a seventh region located between the sixth region and a channel region of the third transistor, wherein the other of main terminals of the third transistor includes an eighth region and a ninth region located between the eighth region and the channel region of the third transistor, wherein the sixth and eighth regions are made of a semiconductor-metal compound, wherein the seventh and ninth regions are made of a semiconductor, and wherein in the plan view perpendicular to the substrate, the length of the current path from the first region to the control terminal of the second transistor is greater than a length of a current path from the sixth region to a control terminal of the third transistor and a length of a current path from the seventh region to the control terminal of the third transistor.

14. The apparatus according to claim 12, wherein the plurality of pixels each includes a terminal configured to connect the other of main terminals of the first transistor and the one of main terminals of the third transistor, and a first capacitive element arranged between the terminal and the other of main terminals of the third transistor.

15. The apparatus according to claim 1, wherein the plurality of pixels each further includes a third transistor configured to short-circuit the anode and a cathode of the light emitting element.

16. The apparatus according to claim 15, wherein one of main terminals of the third transistor includes a sixth region and a seventh region located between the sixth region and a channel region of the third transistor, wherein the other of main terminals of the third transistor includes an eighth region and a ninth region located between the eighth region and the channel region of the third transistor, wherein the sixth and eighth regions are made of a semiconductor-metal compound, wherein the seventh and ninth regions are made of a semiconductor, and wherein in the plan view perpendicular to the substrate, the length of the current path from the first region to the control terminal of the second transistor is greater than a length of a current path from the sixth region to a control terminal of the third transistor and a length of a current path from the seventh region to the control terminal of the third transistor.

17. The apparatus according to claim 1, wherein in the plan view perpendicular to the substrate, a distance between an end of the first region and an end of the control terminal of the second transistor is greater than a distance between an end of the third region and an end of the control terminal of the second transistor.

18. The apparatus according to claim 1, wherein the light emitting element is an organic light emitting element including an organic light emitting layer.

19. A display apparatus comprising:

the apparatus according to claim 1;

signal lines connected to the plurality of pixels; and a signal output circuit configured to supply signals to the signal lines.

20. A display apparatus comprising:

an imaging apparatus; and the apparatus according to claim 1 as a display unit, wherein a display image on the display unit is controlled based on a user's line of sight information provided by the imaging apparatus.

21. A conversion apparatus comprising:

an optical unit including a plurality of lenses;

a sensor configured to receive light passed through the optical unit; and a display unit configured to display an image captured by the sensor, wherein the display unit includes the apparatus according to claim 1.

22. A device comprising:

a display unit including the apparatus according to claim 1; and a housing where the display unit is disposed.

23. An illumination apparatus comprising:

a light source including the apparatus according to claim 1; and a light diffusion device or an optical film configured to transmit light emitted from the light source.

24. A moving body comprising:

a lighting unit including the apparatus according to claim 1; and a body on which the lighting unit is disposed.

25. The apparatus according to claim 2, wherein the fifth region has an impurity concentration lower than impurity concentrations of the first and second regions.

* * * * *